(12) United States Patent
Kizekai et al.

(10) Patent No.: US 12,535,469 B2
(45) Date of Patent: Jan. 27, 2026

(54) SIZE EXCLUSION CHROMATOGRAPHY COLUMN TECHNOLOGIES FOR ANALYSIS OF CRISPR MOLECULES

(71) Applicant: Waters Technologies Corporation, Milford, MA (US)

(72) Inventors: Lavelay Kizekai, Coventry, RI (US); Stephen Shiner, Holden, MA (US); Matthew Lauber, North Smithfield, RI (US)

(73) Assignee: Waters Technologies Corporation, Milford, MA (US)

( * ) Notice: Subject to any disclaimer, the term of this patent is extended or adjusted under 35 U.S.C. 154(b) by 395 days.

(21) Appl. No.: 18/168,865

(22) Filed: Feb. 14, 2023

(65) Prior Publication Data

US 2023/0266284 A1    Aug. 24, 2023

Related U.S. Application Data

(60) Provisional application No. 63/320,022, filed on Mar. 15, 2022, provisional application No. 63/320,043, (Continued)

(51) Int. Cl.
*G01N 30/14* (2006.01)
*B01D 15/34* (2006.01)
(Continued)

(52) U.S. Cl.
CPC ......... *G01N 30/7233* (2013.01); *B01D 15/34* (2013.01); *G01N 30/14* (2013.01);
(Continued)

(58) Field of Classification Search
CPC .... G01N 30/7233; G01N 30/14; G01N 30/88; G01N 2030/027; G01N 2030/8831;
(Continued)

(56) References Cited

U.S. PATENT DOCUMENTS

| 4,017,528 A | 4/1977 | Unger et al. |
| 6,528,167 B2 | 3/2003 | O'Gara |

(Continued)

FOREIGN PATENT DOCUMENTS

| CN | 106404946 A | 2/2017 |
| WO | 2019239329 A1 | 12/2019 |

(Continued)

OTHER PUBLICATIONS

Kizekai et al. "Exploring the SEC Analysis of CRISPR Molecules and Their Complexes." Waters™ Application Note. Sep. 2022.
(Continued)

*Primary Examiner* — David J Bolduc
(74) *Attorney, Agent, or Firm* — WOMBLE BOND DICKINSON (US) LLP; Deborah M. Vernon; Scott R. Breining

(57) ABSTRACT

The present disclosure is directed to methods for performing size exclusion chromatographic (SEC) separations. Embodiments of the present disclosure feature methods for improved separations of biomolecule analytes, such as CRISPR-related proteins, nucleotides, and ribonucleoprotein complexes, in SEC, for example, by using hydroxy-terminated polyethylene glycol surface modified stationary phase materials and/or C2/PEG surface modified column hardware.

24 Claims, 16 Drawing Sheets

Related U.S. Application Data filed on Mar. 15, 2022, provisional application No. 63/311,973, filed on Feb. 19, 2022.

(51) Int. Cl.
  *G01N 30/72* (2006.01)
  *G01N 30/88* (2006.01)
  *G01N 30/02* (2006.01)

(52) U.S. Cl.
  CPC ....... *G01N 30/88* (2013.01); *G01N 2030/027* (2013.01); *G01N 2030/8831* (2013.01)

(58) Field of Classification Search
  CPC ........ B01D 15/34; B01D 15/20; B01D 15/22; B01J 20/28097; B01J 20/283; B01J 20/288
  See application file for complete search history.

(56) References Cited

U.S. PATENT DOCUMENTS

| | | |
|---|---|---|
| 6,686,035 B2 | 2/2004 | Jiang et al. |
| 7,175,913 B2 | 2/2007 | O'Gara |
| 2015/0338398 A1* | 11/2015 | Tackett .............. G01N 33/6875 435/6.19 |
| 2016/0334415 A1* | 11/2016 | Tackett .............. G01N 33/5308 |
| 2018/0100158 A1* | 4/2018 | Del'Guidice .......... C07K 16/46 |
| 2019/0062373 A1* | 2/2019 | Baek ........................ C07K 7/06 |
| 2019/0086371 A1 | 3/2019 | Lauber et al. |
| 2019/0324030 A1* | 10/2019 | Tareen .................... A61P 35/00 |
| 2019/0376933 A1* | 12/2019 | Wyndham .............. B01D 15/34 |
| 2020/0182884 A1* | 6/2020 | Tareen .................... A61K 40/22 |
| 2020/0263264 A1* | 8/2020 | Shalek .................... A61P 31/18 |
| 2021/0325352 A1* | 10/2021 | Shiner ................ G01N 30/6065 |
| 2022/0080385 A1* | 3/2022 | Lawrence .......... B01J 20/28016 |
| 2022/0080388 A1 | 3/2022 | Tunc Sarisozen et al. |
| 2022/0111073 A1* | 4/2022 | Unger ..................... A61P 11/00 |
| 2022/0118443 A1 | 4/2022 | DeLano et al. |
| 2022/0349896 A1* | 11/2022 | Heidebrecht .......... C07K 19/00 |

FOREIGN PATENT DOCUMENTS

| | | |
|---|---|---|
| WO | 2021211863 A1 | 10/2021 |
| WO | 2022061026 A1 | 3/2022 |
| WO | 2022061039 A1 | 3/2022 |
| WO | 2022079695 A1 | 4/2022 |

OTHER PUBLICATIONS

Sehnal et al. "Mol* Viewer: modern web app for 3D visualization and analysis of large biomolecular structures." Nucl. Acids Res. 49.W1(2021): 431-437.

Fekete et al. "Size exclusion and Ion Exchange Chromatographic Hardware Modified wth a Hydrophilic Hybrid Surface." Anal. Chem. 94(2022): 3360-3367.

International Search Report and Written Opinion issued in International Patent Application No. PCT/IB2023/051341 dated May 8, 2023.

\* cited by examiner

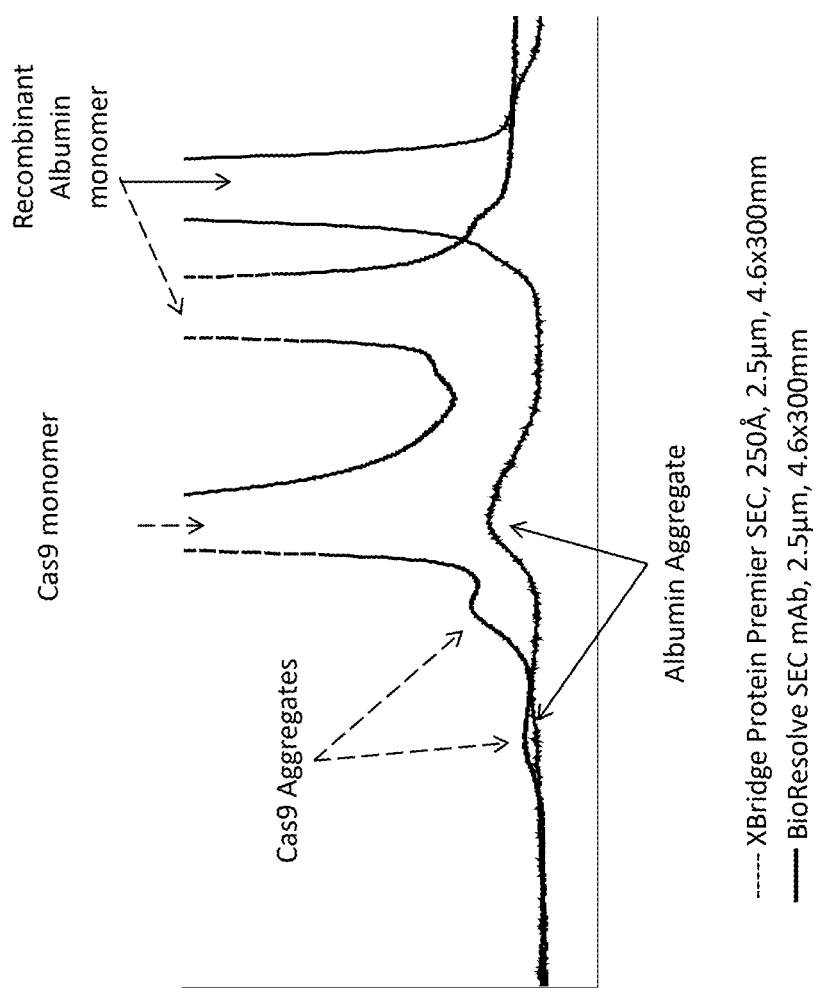

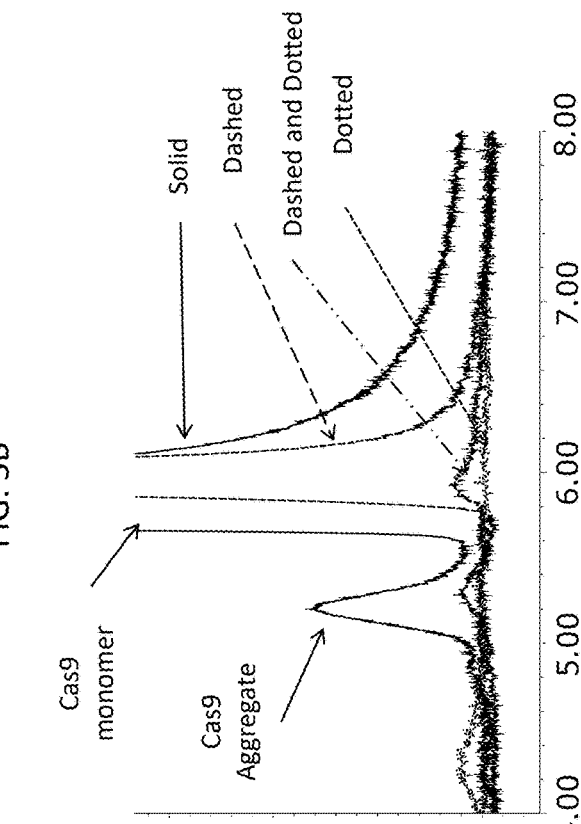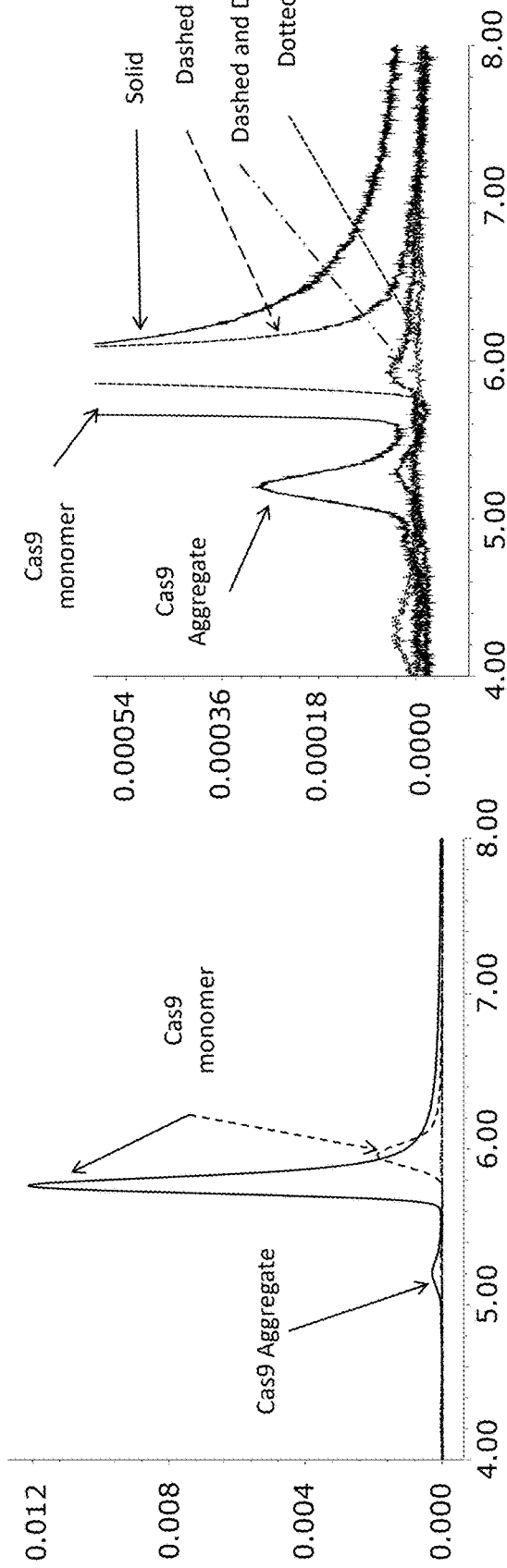

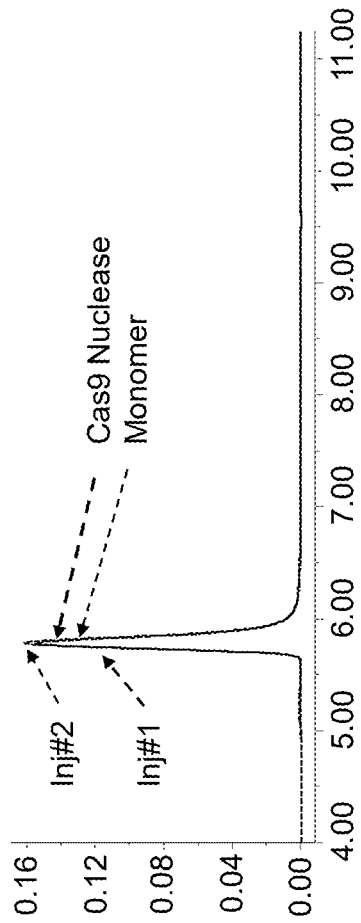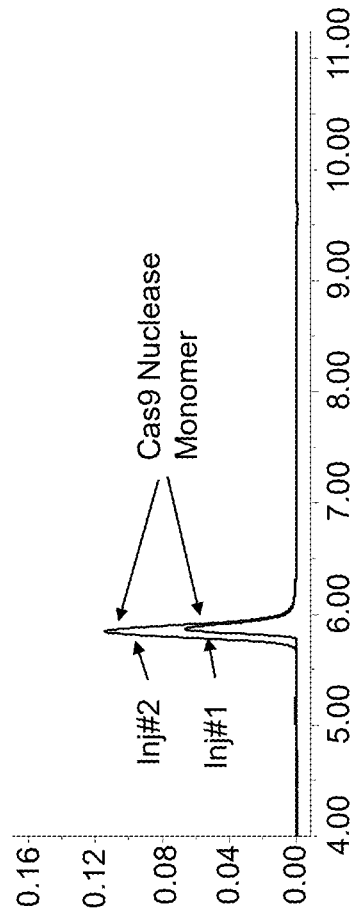

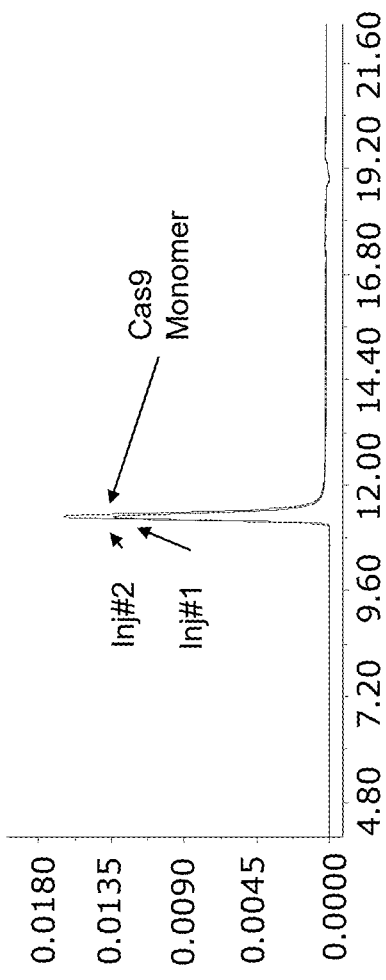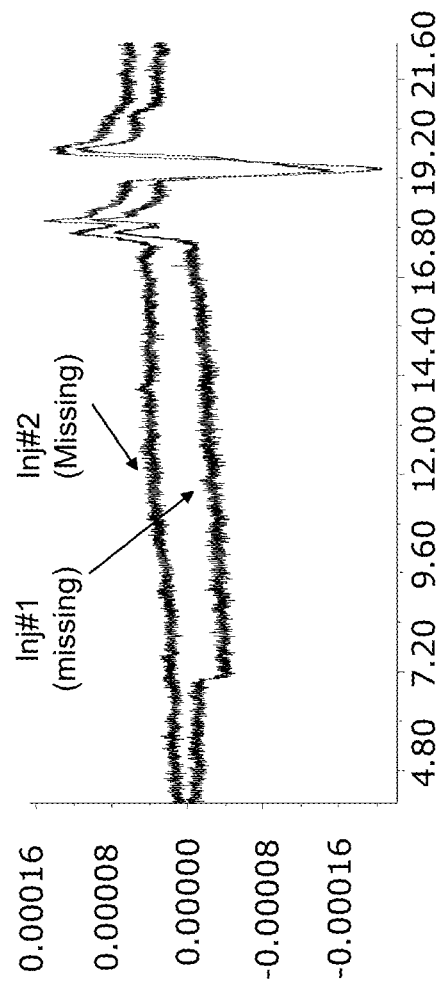

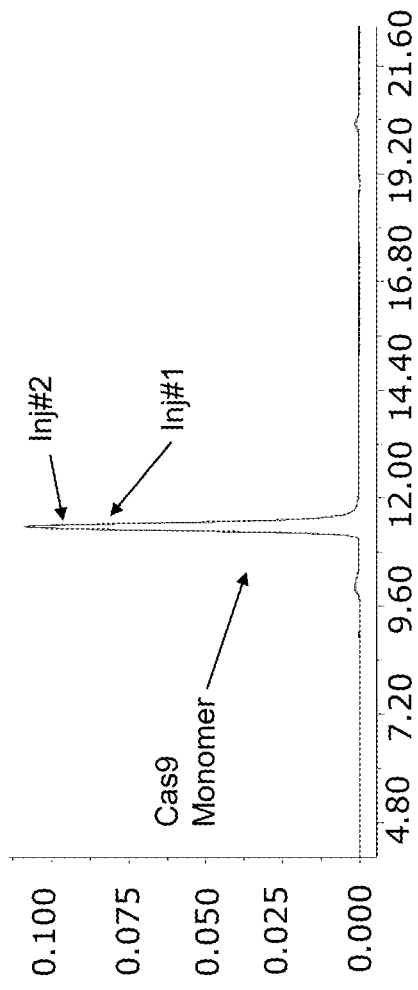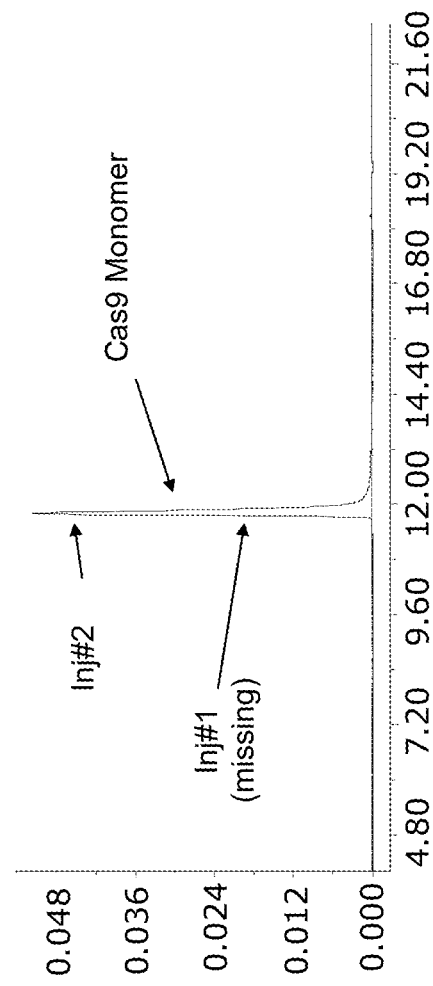

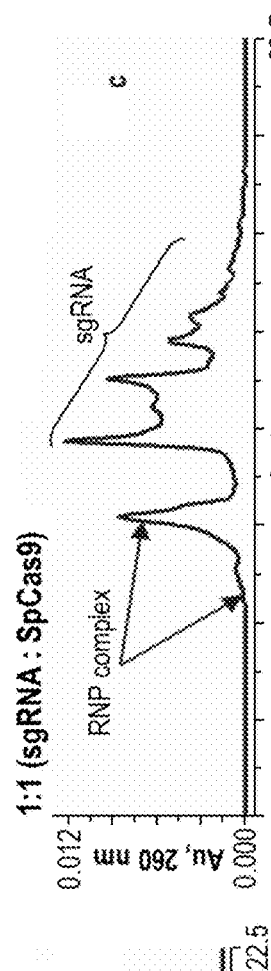
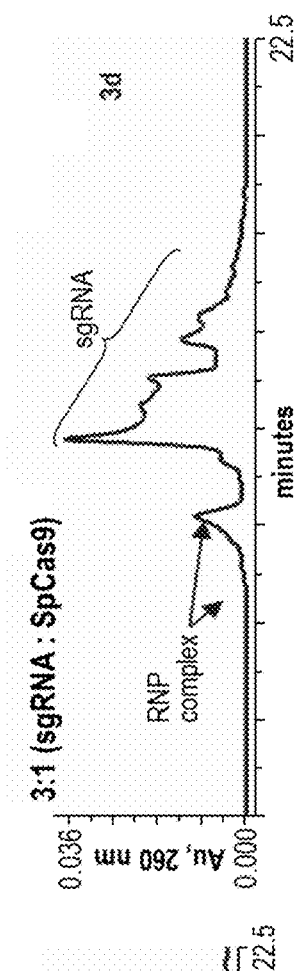
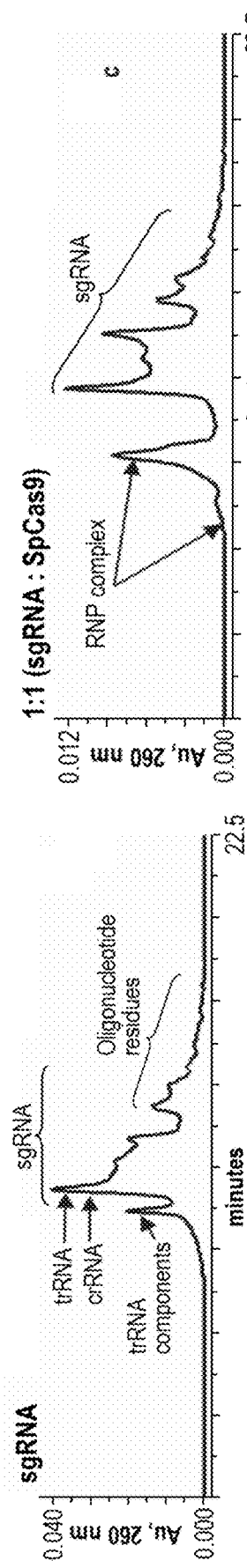
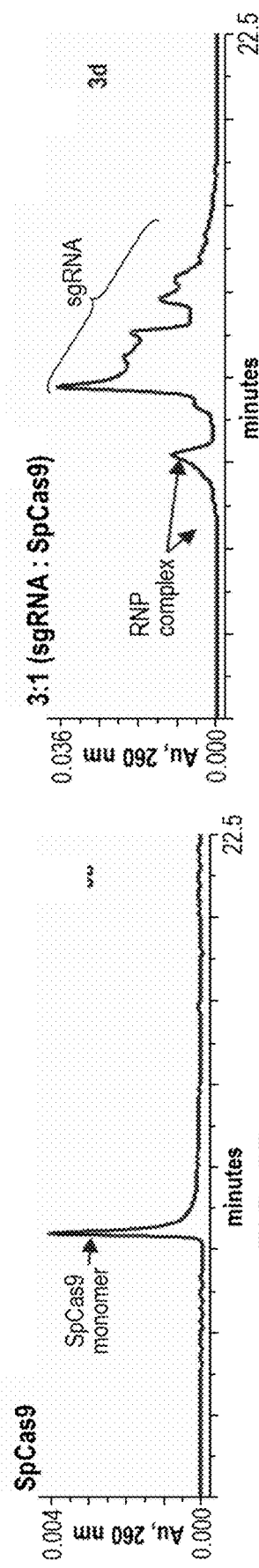
FIG. 8A
FIG. 8B
FIG. 8C
FIG. 8D

SIZE EXCLUSION CHROMATOGRAPHY COLUMN TECHNOLOGIES FOR ANALYSIS OF CRISPR MOLECULES

CROSS-REFERENCE TO RELATED APPLICATIONS

This patent application claims priority to and the benefit of U.S. Provisional Application No. 63/320,043, filed Mar. 15, 2022. This application also claims priority to and the benefit of U.S. Provisional Application No. 63/320,022, filed Mar. 15, 2022. This application also claims priority to and the benefit of U.S. Provisional Application No. 63/311,973, filed Feb. 19, 2022. Each of the foregoing applications is herein incorporated by reference in its entirety.

TECHNICAL FIELD

The present disclosure relates to methods of performing size exclusion chromatography on Clustered Regularly Interspaced Short Palindromic Repeats (CRISPR)-related molecules.

BACKGROUND

Size exclusion chromatography (SEC) is a common separation technique that employs differences in hydrodynamic radii to separate solubilized analytes on an immobilized stationary phase. In theory, perfect SEC separates exclusively based on the hydrodynamic radii; however, secondary interactions, such as ionic and hydrophobic interactions, can cause undesired effects including peak broadening, tailing, and loss of resolution and separation efficiency. Secondary interactions can be especially problematic with biomolecules, particularly larger structures, because they have a capacity (via their size and structural order) to form microenvironments that can adversely interact with separation components and flow path surfaces. Such non-specific electrostatic and hydrophobic secondary interactions affect the quality of the separation and an analyst's ability to characterize and monitor important product-related impurities, such as those which may be present in biopharmaceutical materials. To overcome this challenge, researchers have often needed to perform extensive method development experiments to find the appropriate additives, salt concentrations, and/or organic solvent strengths for accurate quantitation of e.g., protein aggregates and fragments. Mobile phase optimization is generally tedious, time consuming, and lacks ease of use for novice users.

Accordingly, it would be desirable in the art to provide methods of performing SEC separations which reduce secondary interactions of biomolecule analytes, such as analytes comprising proteins and/or nucleic acids, with the surfaces to which they are exposed during SEC separations, and further, which simplify mobile phase selection.

SUMMARY

The present technology is generally directed to methods for improved size exclusion chromatography (SEC). In particular, methods of the present technology feature performing an SEC separation of mRNA analyte, such as a Clustered Regularly Interspaced Short Palindromic Repeat (CRISPR)-associated (Cas) proteins, ribonucleic acids, and CRIPSR-ribonucleoprotein complexes. SEC separations of Cas proteins are particularly challenging due to the propensity of such analytes to experience non-specific secondary interactions with stationary phase materials and traditional (e.g., stainless-steel) chromatography system hardware. Particularly, analysis of the *S. pyogenes* Cas9 protein (SpCas9) crystal structure has indicated the presence of a highly basic cleft comprising Lys and Arg resides (Sehnal, et al. Nucleic Acids Research 2021; 49 (W1): 431-437). Further, SpCas9 also presents an acidic domain exhibiting strong electronegativity, corresponding to a concentrated region of Asp and Glu residues. Without wishing to be bound by any particular theory, it is believed that the electronegativity of this motif may be responsible for the challenging chromatographic separations of the protein, and the strong electronegativity would be predicted to show affinity for and adsorptive losses from metallic column hardware. Such secondary interactions impede the ability to quantify free Cas proteins and free RNA in analyses of CRISPR-ribonucleoprotein complexes due to, e.g., poor analyte recovery. Further, recovery challenges may be compounded by the presence on the Cas protein of a fusion protein domain or an affinity tag, such as a histidine-containing affinity tag used for nickel affinity-based enrichment procedures.

Some embodiments of the present technology feature minimization of the above recovery issues through the use of improved SEC methods and materials to deliver accurate relative abundance determinations, which provide indications of the stability of the complexes and, indirectly, the strength of the intermolecular non-covalent interactions of such complexes. Surprisingly, as disclosed herein, hardware having an organosilane modified surface, alone or in combination with a newly developed SEC packing material based on 250 Å BEH™ particles and a hydroxy PEO bonding, provided enhanced recoveries of multiple Cas9 molecules when compared to conventional stainless-steel column hardware.

Generally, the methods disclosed herein utilize a chromatography system which includes metallic flow path components having wetted surfaces, wherein at least a portion of its wetted surfaces comprise an organosilane coating. For example, portions of the wetted surface can include a coating that covers the metallic flow path with a 20 nm to 1000 nm thick (or possibly up to 2000 nm) thick vapor-deposited coating. The coating can consist of a single type of material or in some embodiments, it can include multiple materials. The multiple materials can be deposited in different layers. In some embodiments, the organosilane coating is a two-carbon (C2) alkylsilane coating, such as that obtained by vapor deposition on the wetted surface with e.g., bis(trichlorosilyl) ethane or bis(trimethoxysilyl) ethane. In some embodiments, the alkylsilane coating is hydrophilic and non-ionic, comprising a polyethylene glycol silane. In certain embodiments, the organosilane coating is a multilayered coating in which a C2 alkylsilane coating is deposited on the exposed surfaces within the fluidic path of the column (i.e., C2 is in direct contact with the exposed surfaces, e.g., metal surfaces, of the column). Additional layers of material, such as C10 or a polyethylene glycol silane, or even other C2 layers, are subsequently deposited.

The system may be utilized with conventional SEC stationary phase materials, or in combination with a stationary phase material that provides improved performance and reduced secondary interactions. In particular, in some embodiments, the methods feature use of a stationary phase that comprises porous particles having a surface, wherein at least some portion of the surface is modified with a hydroxy-terminated polyethylene glycol.

Ensuring Cas proteins are free of aggregates is essential for avoidance of immunogenic responses and efficacy in potential CRISPR-Cas therapies. Surprisingly, it has been found according to the present disclosure that chromatographic monitoring of Cas9 protein content in a sample can be performed rapidly and efficiently with the advanced column technology disclosed herein, using a simple mobile phase eluant with minimal method development. The separation method disclosed herein (i.e., using coated hardware and optionally, a surface modified stationary phase material) provides a significant advancement in the ability to assess the quality, purity, stability, and propensity for aggregate or fragment formation of CRISPR-associated protein monomers. This technology is helpful in ensuring that Cas proteins used in CRISPR can be safely monitored for stability throughout the lifetime of potential products. Further, without wishing to be bound by theory, it is believed that the recovery and peak shape of certain RNA molecules (e.g., RNA molecules associated with the performance of CRISPR gene editing, including, but not limited to, single guide (sg) RNA, CRISPR (cr) RNA that define complementarity, and trans-activating CRISPR (tracr) RNA) may be advantageously improved according to the disclosed methods.

Accordingly, the present technology is directed to an improved size exclusion chromatography (SEC) method which includes utilizing a chromatography system having metallic flow path components having wetted surfaces, wherein at least a portion of its wetted surfaces comprise an organosilane coating. The method may further comprise using, in combination with said chromatography system, a stationary phase material based on hydroxy-terminated PEG surface-modified silica or hydroxy-terminated PEG surface-modified inorganic-organic hybrid particles. In some embodiments, the use of metallic flow path components having such a coating layer, in combination with the hydroxy-terminated PEG surface modified SEC stationary phase material, is particularly advantageous in reducing secondary interactions of CRISPR-Cas protein and associated protein analytes with the stationary phase, and hardware (e.g., metallic flow path, including the column, tubing, one or more column frits, or even the entire flow path of a chromatography device). Such advantages include one or more of the ability to perform SEC separations with weakly buffered mobile phase, simplified method development including reduced dependence on buffers, pHs, and column temperatures, enhanced analyte recovery, improved analyte peak shape, enhanced peak resolution, enhanced reproducibility, and the potential to utilize SEC with mass spectrometric detection in the separations of CRISPR/Cas9, its counterpart nucleic acids, and to study RNP complexes and their formation.

In one aspect is provided a method for performing size exclusion chromatography on a sample containing at least one analyte, the method comprising:
a. contacting said sample with a column chromatography device comprising a column having an interior for accepting a stationary phase, and an immobilized stationary phase within said interior of the column, wherein the column has an interior wetted surface, wherein at least a portion of its wetted surface comprises a non-ionic, hydrophilic organosilane coating;
b. flowing a mobile phase through the immobilized stationary phase for a period of time, the mobile phase comprising water and a buffer; and
c. eluting the at least one analyte from the immobilized stationary phase in the mobile phase.

In some embodiments, the column chromatography device comprises a system comprising a metallic flow path components having wetted surfaces, wherein at least a portion of the wetted surfaces comprise a non-ionic, hydrophilic organosilane coating. In some embodiments, the organosilane coating comprises a C2 alkylsilane layer. In some embodiments, the hydrophilic, non-ionic organosilane coating comprises an organosilane layer comprising a polyethylene glycol (PEG) silane.

In some embodiments, the immobilized stationary phase comprises porous particles having a surface, wherein at least some portion of the surface is modified with a hydroxy-terminated polyethylene glycol.

In some embodiments, the porous particles comprise silica, an inorganic-organic hybrid material, or a polymer. In some embodiments, the porous particles comprise inorganic-organic hybrid ethylene bridged particles having an empirical formula of $SiO_2$ $(O_{1.5}SiCH_2CH_2SiO_{1.5})_{0.25}$.

In some embodiments, the hydroxy-terminated polyethylene glycol has the formula:

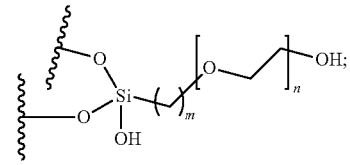

wherein:
m is an integer from about 1 to about 10;
n is an integer from about 2 to about 50; and
wherein the wavy lines indicate points of attachment to the surface of the porous particles.

In some embodiments, m is 2 or 3. In some embodiments, n is from about 5 to about 15, or from about 8 to about 12. In some embodiments, m is 3 and n is from about 8 to about 12.

In some embodiments, the mobile phase buffer comprises phosphate or acetate. In some embodiments, the mobile phase buffer is ammonium acetate. In some embodiments, the mobile phase buffer is sodium phosphate monobasic, sodium phosphate dibasic, potassium phosphate monobasic, potassium phosphate dibasic, or a combination thereof.

In some embodiments, a pH value of the mobile phase is from about 5.0 to about 10.0, from about 5.0 to about 8.0, or from about 6.0 to about 7.5.

In some embodiments, the mobile phase further comprises an alkali metal salt, an organic co-solvent, or both.

In some embodiments, the at least one analyte comprises an RNA, a protein, or a ribonucleoprotein complex associated with Clustered Regularly Interspaced Short Palindromic Repeats (CRISPR)-based gene editing. In some embodiments, the at least one analyte comprises a CRISPR-associated (Cas) protein, a CRISPR-related construct, or CRISPR-related complex.

In some embodiments, the at least one analyte is selected from the group consisting of Cas proteins, single-stranded oligodeoxynucleotide (ssODN) templates, ribonucleoprotein (RNP) complexes, nickases, crRNAs that define complementarity, trans-activating CRISPR RNA (tracrRNA), single-guide RNA (sgRNA), and combinations thereof.

In some embodiments, the at least one analyte comprises a Cas protein. In some embodiments, the Cas protein is Cas9 or Cas12a. In some embodiments, the Cas9 protein is expressed by or derived from *Staphylococcus aureus* or *Streptococcus pyogenes*. In some embodiments, the Cas9 protein does not comprise an affinity handle. In some embodiments, the Cas9 protein comprises an affinity handle. In some embodiments, the affinity handle comprises histidine residues. In some embodiments, the Cas9 protein is monomeric, or wherein a portion of the Cas9 protein is present in the form of one or more aggregates.

In some embodiments, the Cas protein is complexed to an RNA. In some embodiments, the analyte comprises a protein-free RNA.

In some embodiments, the method further comprises detecting the presence or absence of the at least one analyte in the sample.

In some embodiments, the method further comprises differentiating monomeric versus aggregated Cas9 proteins, quantitating monomeric versus aggregated Cas9 proteins, or both.

In some embodiments, the method further comprises differentiating free and unbound Cas9 proteins, quantitating free and unbound Cas9 proteins, differentiating free and unbound mRNA's quantitating free and unbound mRNA's, or combinations thereof.

In some embodiments, the detecting, differentiating, and/or quantitating is performed using a refractive index detector, a UV detector, a light-scattering detector, a mass spectrometer, or combinations thereof. In some embodiments, the detecting, differentiating, and/or quantitating is performed using mass spectrometry.

BRIEF DESCRIPTION OF THE DRAWINGS

In order to provide an understanding of embodiments of the technology, reference is made to the appended drawings, which are not necessarily drawn to scale. The drawings are exemplary only and should not be construed as limiting the technology. The disclosure described herein is illustrated by way of example and not by way of limitation in the accompanying figures.

FIGS. 2A and 2B depict exemplary chromatographic separation of Cas9 protein performed on a reference diol bonded stationary phase column, and an exemplary chromatographic separation of Cas9 protein performed on a novel, hydroxy-terminated PEG surface-modified, inorganic-organic hybrid particle stationary phase SEC column according to an embodiment of the disclosure, the column interior and frit having a coating according to an embodiment of the disclosure (i.e., comprising a hydrophilic, non-ionic C2/PEG coated surface). FIG. 2A is a full view comparison of the two separations. FIG. 2B is an enhanced view relative to FIG. 2A.

FIGS. 3A and 3B depict exemplary chromatographic separation of Cas9 protein performed on a reference diol bonded stationary phase column, and an exemplary chromatographic separation of Cas9 protein performed on a novel, hydroxy-terminated PEG surface-modified, inorganic-organic hybrid particle stationary phase SEC column according to an embodiment of the disclosure, the column interior and frit having a coating according to an embodiment of the disclosure (i.e., comprising a hydrophilic, non-ionic C2/PEG coated surface). FIG. 3A is a full view comparison of the two separations. FIG. 3B is an enhanced view relative to FIG. 3A.

FIG. 4A is a full view comparison of the two separations. FIG. 4B is an enhanced view relative to FIG. 4A.

FIG. 5C depicts exemplary chromatographic separations of a S. pyogenes Cas9 protein with a C-terminal nuclear localization signal (NLS) performed on a novel, hydroxy-terminated PEG surface-modified, inorganic-organic hybrid particle stationary phase SEC column according to an embodiment of the disclosure the column interior and frit having a coating (i.e., the column and frit comprising a hydrophilic, non-ionic C2/PEG coated surface).

FIG. 5D depicts exemplary chromatographic separations of a S. pyogenes Cas9 protein with a C-terminal nuclear localization signal (NLS) performed on a reference diol bonded stationary phase column.

Figure 6E:
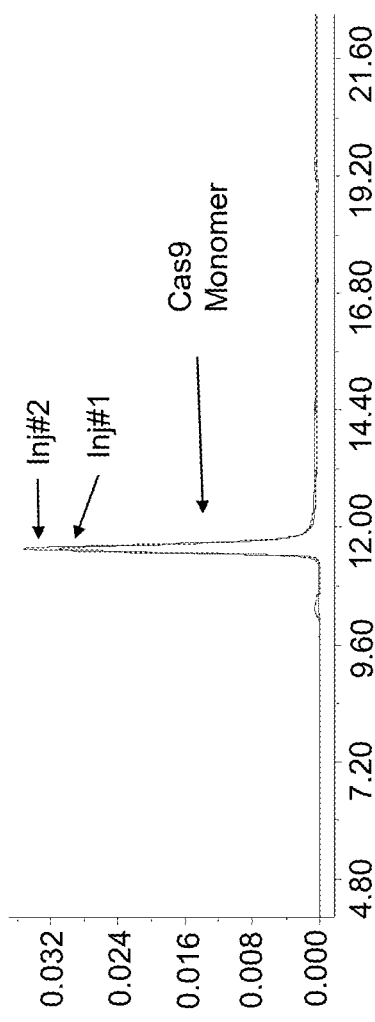
FIG. 6E depicts exemplary chromatographic separations of a hexa-histidine tagged Cas9 protein (EnGen® Sau Cas9 nuclease) performed on a reference diol bonded SEC stationary phase column.
Figure 6F:
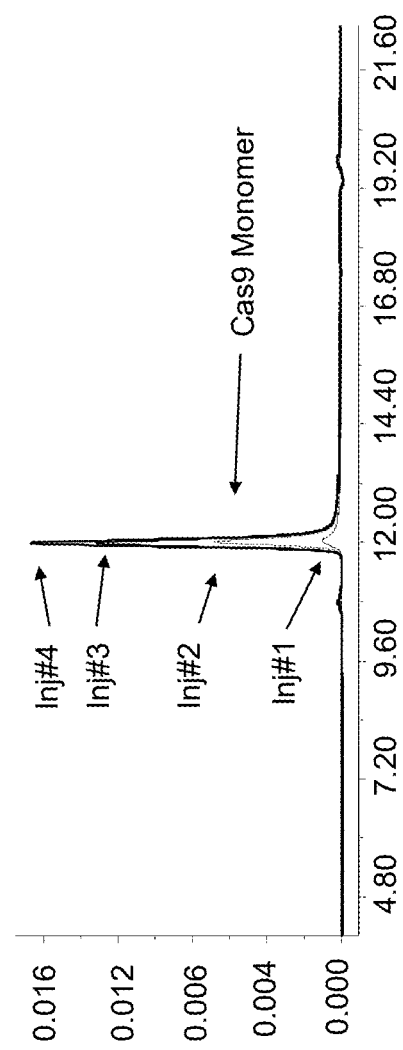
FIG. 6F depicts exemplary chromatographic separations of a hexa-histidine tagged Cas9 protein (EnGen® Sau Cas9 nuclease) performed on a reference diol bonded SEC stationary phase packed into a stainless-steel column with frit, each coated with C2/PEG.
Figure 6G:
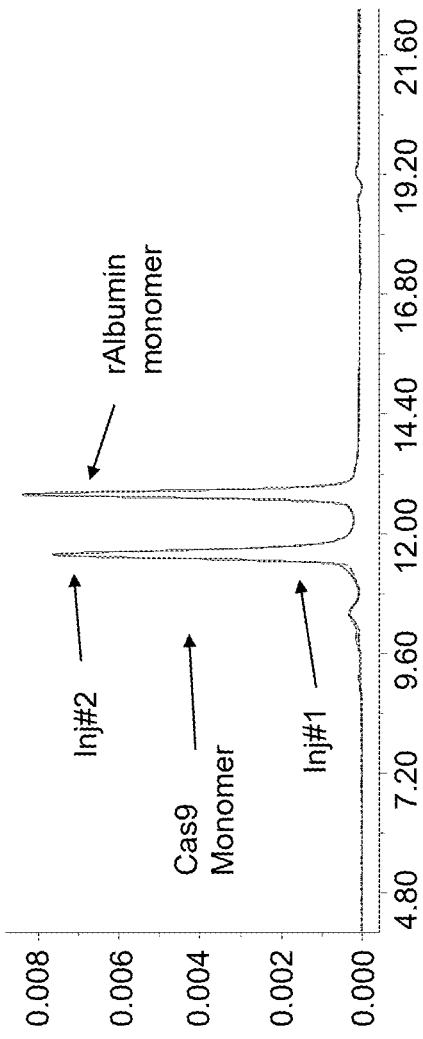
FIG. 6G depicts exemplary chromatographic separations of a hexa-histidine tagged Cas9 protein (EnGen® Sau Cas9 nuclease) in the presence of recombinant albumin, performed on a reference diol bonded SEC stationary phase column.
Figure 6H:
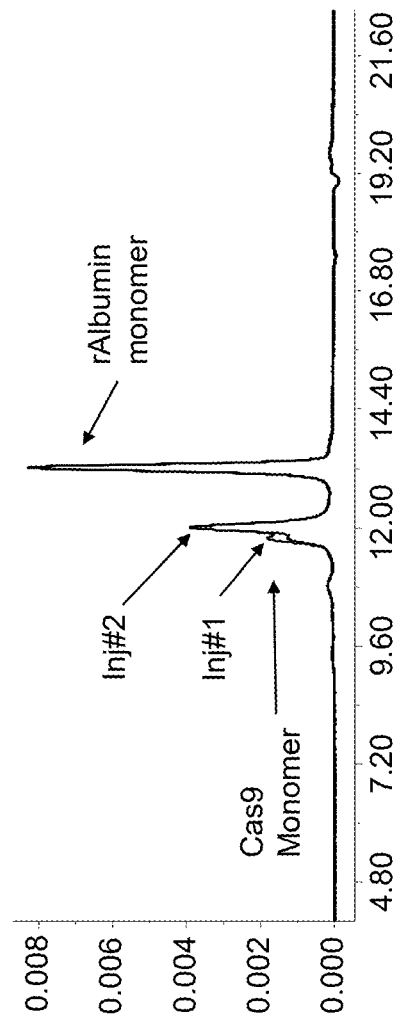
FIG. 6A depicts exemplary chromatographic separations of an engineered, high fidelity, tagless Cas9 protein performed on a reference diol bonded SEC stationary phase column.
FIG. 6B depicts exemplary chromatographic separations of an engineered, high fidelity, tagless Cas9 protein performed on a reference diol bonded SEC stationary phase packed into a stainless-steel column with frit, each coated with C2/PEG.
FIG. 6C depicts exemplary chromatographic separations of a tagless Cas9 protein (NLS; Horizon Biosciences) performed on a reference diol bonded SEC stationary phase column.
FIG. 6D depicts exemplary chromatographic separations of a tagless Cas9 protein (NLS; Horizon Biosciences) performed on a reference diol bonded SEC stationary phase packed into a stainless-steel column with frit, each coated with C2/PEG.

FIG. 6H depicts exemplary chromatographic separations of a hexa-histidine tagged Cas9 protein (EnGen® Sau Cas9 nuclease) in the presence of recombinant albumin, performed on a reference diol bonded SEC stationary phase packed into a stainless-steel column with frit, each coated with C2/PEG.

Figure 7B:
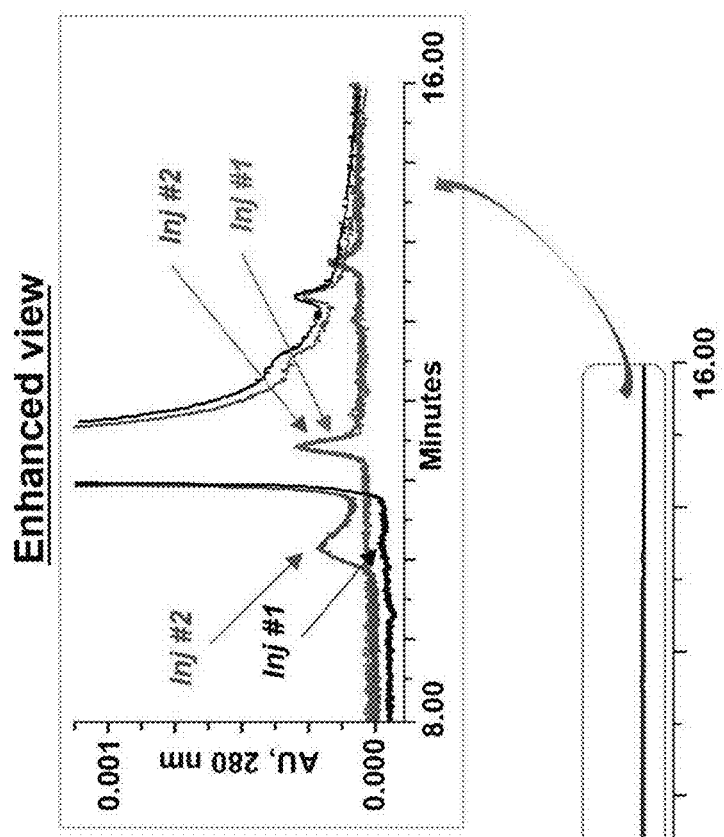
Figure 7A:
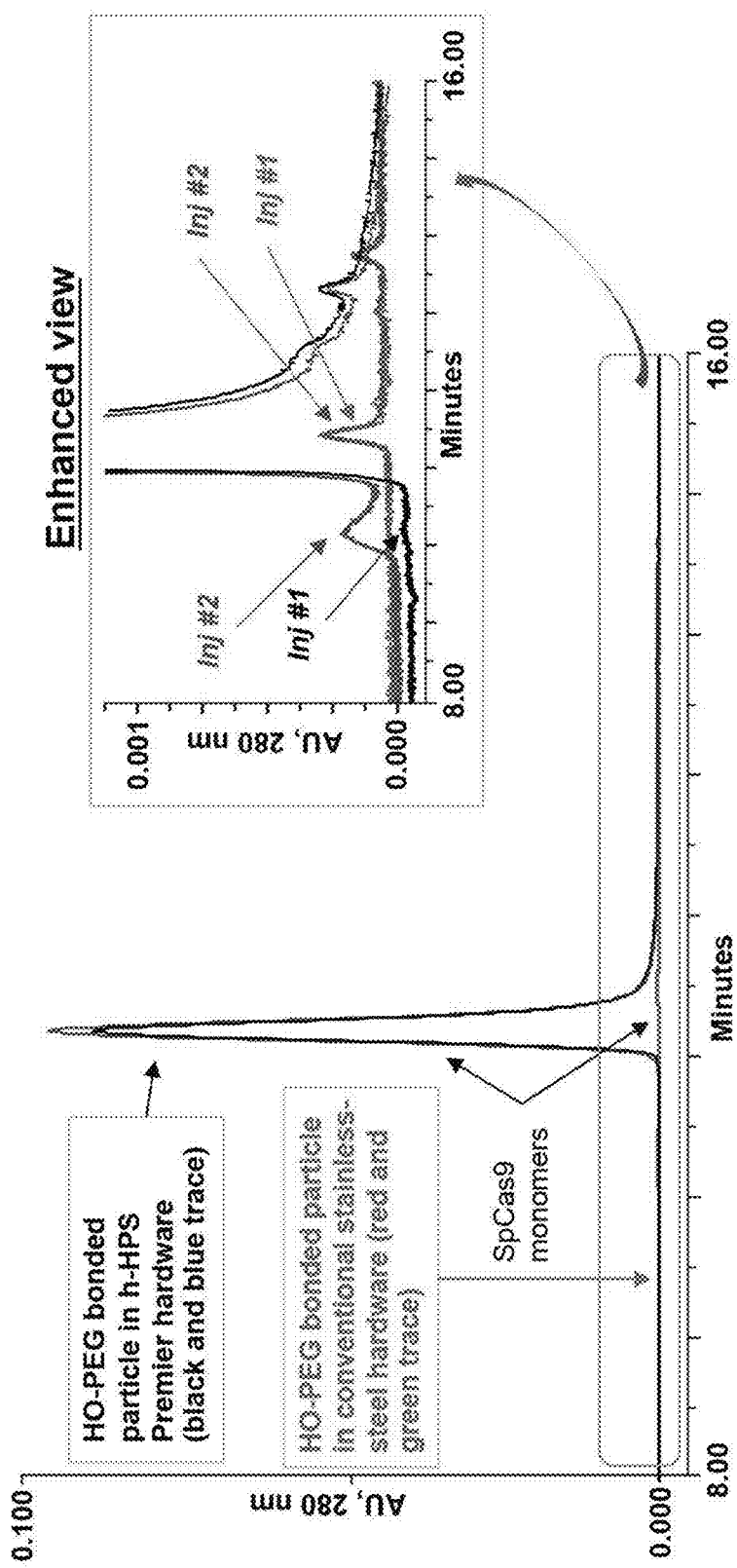

FIG. 7A depicts exemplary chromatographic separations of SpCas9 protein using conventional stainless-steel column hardware and MaxPeak High Performance Surfaces (h-HPS) column hardware.

FIG. 7B is an enhanced view of the chromatographic separations relative to FIG. 7A.

FIG. 8A depicts an exemplary chromatographic separation of engineered sgRNA.

FIG. 8B depicts an exemplary chromatographic separation of SpCas9 protein.

FIG. 8C depicts an exemplary chromatographic separation of a 1:1 mixture of sgRNA to SpCas9.

FIG. 8D depicts an exemplary chromatographic separation of a 3:1 mixture of sgRNA to SpCas9.

Figure 9:
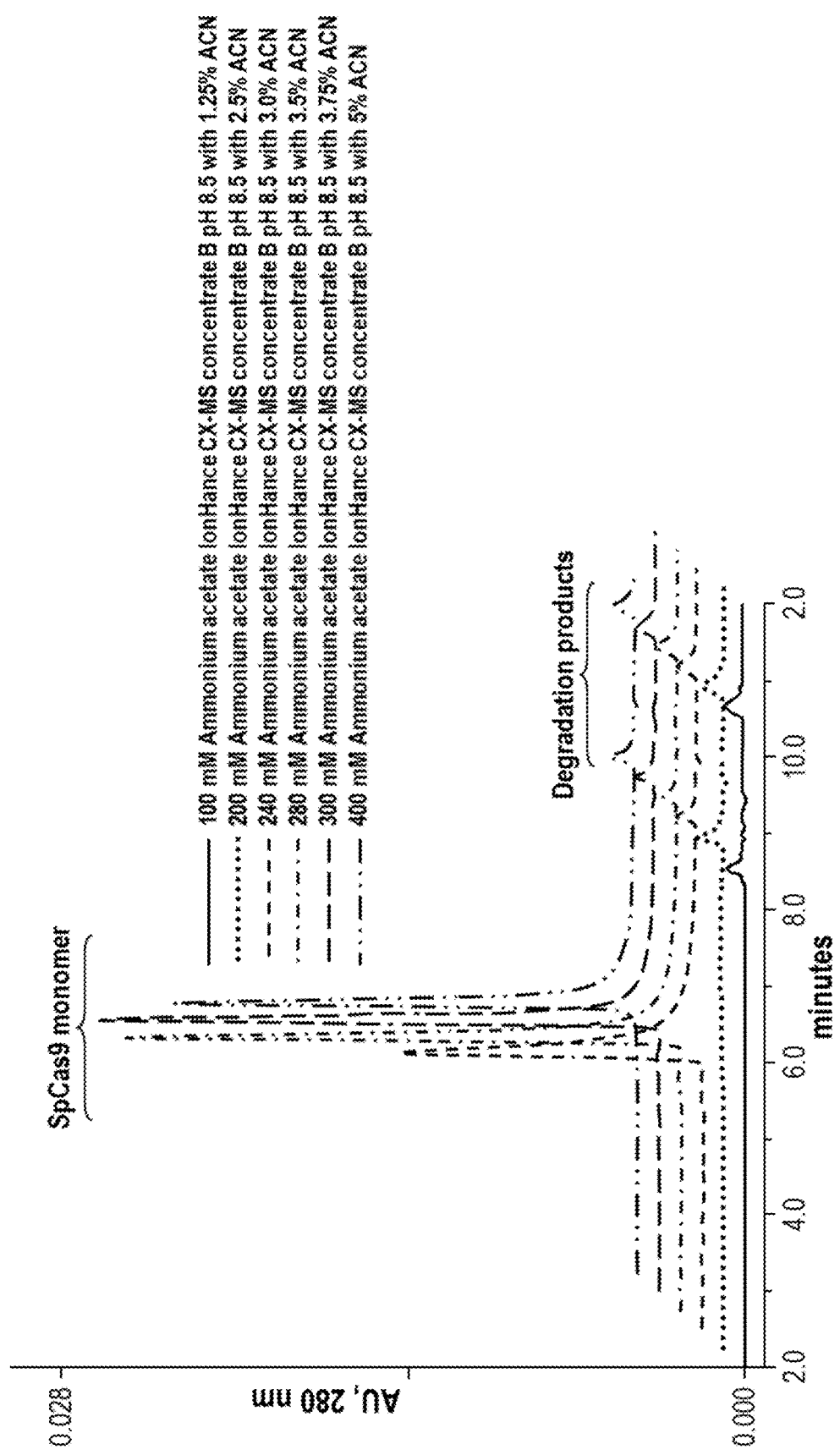

FIG. 9 depicts exemplary chromatographic separations of SpCas9 protein using various concentrations of ammonium acetate in the mobile phase.

Figure 10B:
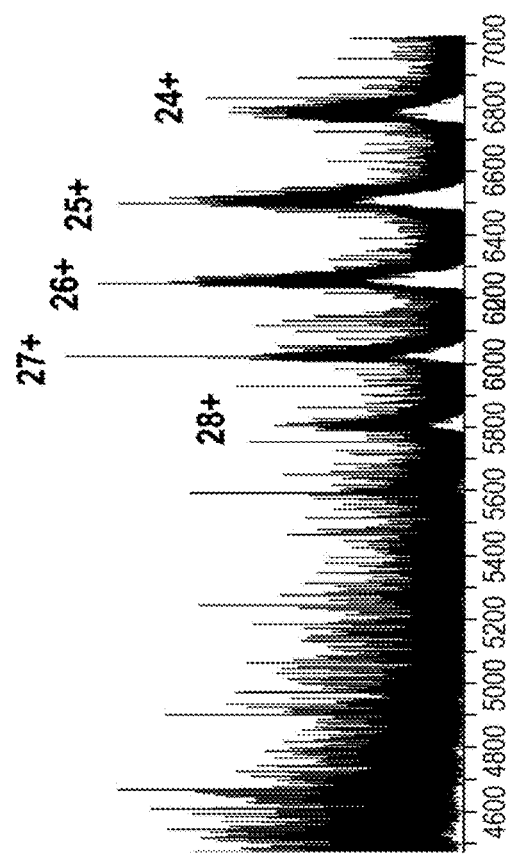
Figure 10A:
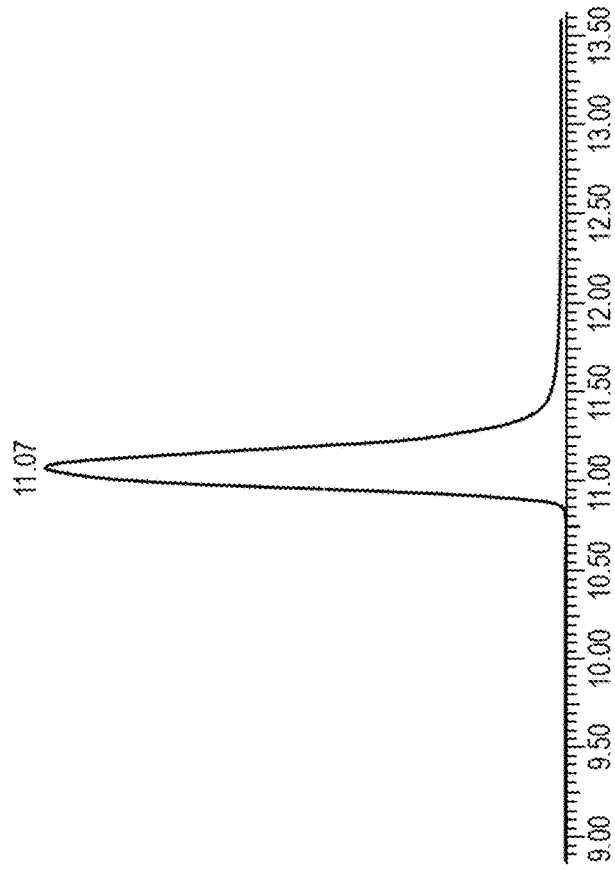

FIG. 10A depicts an exemplary total ion chromatogram of SpCas9 protein acquired by QTof ESI-MS.

FIG. 10B depicts the summed raw spectrum corresponding to the monomer SpCas9 species for the chromatogram of FIG. 10A.

Figure 10C:
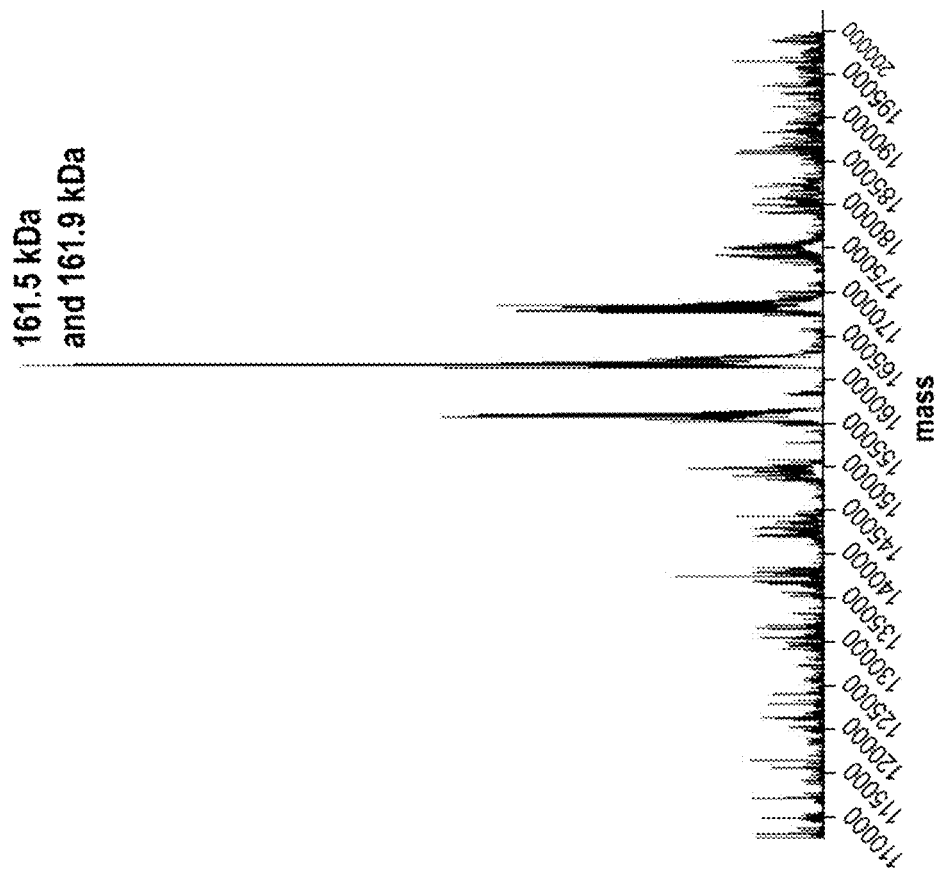

FIG. 10C depicts the corresponding MaxEnt1 deconvolution for the summed raw spectrum of FIG. 10B.

DETAILED DESCRIPTION

Before describing several example embodiments of the technology, it is to be understood that the technology is not limited to the details of construction or process steps set forth in the following description. The technology is capable of other embodiments and of being practiced or being carried out in various ways.

Definitions

With respect to the terms used in this disclosure, the following definitions are provided. This application will use the following terms as defined below unless the context of the text in which the term appears requires a different meaning The articles "a" and "an" are used herein to refer to one or to more than one (i.e., to at least one) of the grammatical object of the article. The term "about" used throughout this specification is used to describe and account for small fluctuations. For example, the term "about" can refer to less than or equal to +5%, such as less than or equal to +2%, less than or equal to +1%, less than or equal to +0.5%, less than or equal to +0.2%, less than or equal to +0.1% or less than or equal to +0.05%. All numeric values herein are modified by the term "about," whether or not explicitly indicated. A value modified by the term "about" of course includes the specific value. For instance, "about 5.0" must include 5.0.

Chromatography is a separation method for concentrating or isolating one or more compounds (e.g., biomolecules) found in a mixture. The compounds (e.g., biomolecules) are normally present in a sample. This disclosure uses the term "sample" broadly to represent any mixture which an individual may desire to analyze. The term "mixture" is used in the sense of a fluid containing one or more dissolved compounds (e.g., biomolecules). A compound of interest present in said sample is referred to as an analyte.

Chromatography is a differential migration process. Compounds in a mixture traverse a chromatographic column at different rates, leading to their separation. The migration occurs by convection of a fluid phase, referred to as the mobile phase, in relationship to a packed bed of particles or a porous monolith structure, referred to as the stationary phase. In some modes of chromatography, differential migration occurs by differences in affinity of analytes with the stationary phase and mobile phase.

Size exclusion chromatography (SEC) is a type of chromatography in which the analytes in a mixture are separated or isolated on the basis of hydrodynamic radius. In SEC, separation occurs because of the differences in the ability of analytes to probe the volume of the porous stationary phase media. See, for example, A. M. Striegel et. al. Modern Size-Exclusion Chromatography: Practice of Gel Permeation and Gel Filtration Chromatography, 2nd Edition, Wiley, NJ, 2009. SEC is typically used for the separation of large molecules or complexes of molecules. For example, without limitation, many large molecules of biological origin ("biomolecules"), such as deoxyribonucleic acids (DNAs), ribonucleic acids (RNAs), proteins, antibodies, polysaccharides, antibody-drug conjugates, and fragments and complexes of any thereof are analyzed by SEC. Synthetic polymers, plastics, and the like are also analyzed by SEC.

SEC is normally performed using a column having a packed bed of particles. The packed bed of particles is a separation media or stationary phase through which the mobile phase will flow. The column is placed in fluid communication with a pump and a sample injector. The sample is loaded onto the column under pressure by the sample injector and the sample components and mobile phase are pushed through the column by the pump. The components in the sample leave or elute from the column with the largest molecules (largest hydrodynamic radius) exiting first and the smallest molecules leaving last.

The SEC column is placed in fluid communication with a detector, which can detect the change in the nature of the mobile phase as the mobile phase exits the column. The detector will register and record these changes as a plot, referred to as a chromatogram, which is used to determine the presence or absence of the analyte, and, in some embodiments, the concentration thereof. The time at which the analyte leaves the column (retention time) is an indication of the size of the molecule. Molecular weight of the molecules can be estimated using standard calibration curves. Examples of detectors used for SEC and anion exchange chromatography are, without limitation, refractive index detectors, UV detectors, light-scattering detectors, and mass spectrometers.

"Hybrid", including "inorganic-organic hybrid material," includes inorganic-based structures wherein an organic functionality is integral to both the internal or "skeletal" inorganic structure as well as the hybrid material surface. The inorganic portion of the hybrid material may be, e.g., alumina, silica, titanium, cerium, or zirconium or oxides thereof, or ceramic material. "Hybrid" includes inorganic-based structures wherein an organic functionality is integral to both the internal or "skeletal" inorganic structure as well as the hybrid material surface. Exemplary hybrid materials are shown in U.S. Pat. Nos. 4,017,528, 6,528,167, 6,686, 035, and 7,175,913, each of which is incorporated by reference herein in its entirety. One non-limiting example of an inorganic-organic hybrid material is an ethylene-bridged hybrid material having an empirical formula of $SiO_2(O_{1.5}SiCH_2CH_2SiO_{1.5})_{0.25}$.

The terms "polyethylene glycol" and "polyethylene oxide" are used synonymously herein, both terms referring to oligomeric or polymeric polyether compounds having the formula $(O-CH_2CH_2)_n-OH$. Accordingly, the abbreviations for "polyethylene glycol" and "polyethylene oxide", "PEG" and "PEO", respectively, are used synonymously herein. In reference to PEG and PEO, the term "hydroxy-terminated" is used herein to specify that the exposed terminus of the PEG/PEO chain possesses an —OH group, in contrast to non-hydroxy-terminated PEG, such as methoxy-terminated PEG (having a terminal —OCH$_3$ group).

The term "surface modified" as used herein, refers to a material (e.g., a porous stationary phase particle or core material) which has been reacted with a surface modifying group (a "surface modifier") to covalently bond, non-covalently bond, adsorb, or otherwise attach the surface modifier to the surface of the core material, or the surface of the stationary phase material. In certain embodiments, the surface modifying group is attached to the surface of the material by a siloxane bond. For example, the surface of a hybrid silica material contains silanol groups, which can be reacted with one or more reactive organosilane reagents (e.g., halo or alkoxy substituted silanes), thus producing Si—O—Si—C linkages. The surface modification can be a bonded surface or a coated surface.

The phrase "at least some substantial portion" as used herein to describe the extent of modification (i.e., bonding or coating) with a hydroxy-terminated polyethylene glycol, means that the surface density of the modification (e.g., a hydroxy-terminated polyethylene glycol) on the surface of the stationary phase particles is a minimum of about 0.5 micromole of the hydroxy-terminated polyethylene glycol per square meter of particle surface area (0.5 μmol/m$^2$).

Reference herein to the "surface" of the stationary phase particles is, unless otherwise indicated or contradicted by the context, intended to mean the outermost extent of the particle surface.

The term "modified fluidic flow path" as used herein, refers to a material (e.g., a metallic component of a chromatography system) which has been allowed to react with one or more organosilane reagents to covalently bond the organosilane reagent(s) to the surface of the material. In certain embodiments, the organosilane reagent(s) are attached to the surface of the material by a siloxane bond. For example, the surface of a metallic material contains metal oxides and/or free hydroxyl groups, which can be reacted with one or more reactive organosilane reagents (e.g., halo or alkoxy substituted silanes), thus producing at least M-O—Si—C linkages.

The term "organosilane" as used herein refers to monomeric silicone-based chemicals, similar to hydrocarbons, which have at least one direct bond between a silicon atom and a carbon atom in the molecule.

The term "associated with Clustered Regularly Interspaced Short Palindromic Repeats (CRISPR)-based gene editing" as used herein in reference to analytes, refers to molecules which may be employed in carrying out gene editing using CRISPR technology. Such molecules may include therapeutic agents as well as various intermediates, reagents, and the like utilized in performing such gene editing, including various proteins, ribonucleotides, and constructs and complexes thereof, such as ribonucleoprotein complexes. In some embodiments, the molecule associated with CRIPSR-based gene editing is a CRISPR-associated (Cas) protein. The term "Cas protein" as used herein refers to a protein component of the RNA-guided adaptive immunity system that provides bacteria with sequence-directed defense against invading DNAs or RNAs. The Cas proteins are encoded by the cas genes located in the genomic neighborhood of the CRISPR arrays. Currently 45 Cas protein families have been identified, divided into eight subtypes. For avoidance of any doubt, reference to "Cas protein" herein is intended to contemplate any and all such members, including, but not limited to, Cas9 and Cas 12a.

The terms "CRISPR-related constructs" and "CRISPR-related complexes" as used herein refer to various combinations of RNA and protein molecules (e.g., ribonucleoprotein complexes) prepared for or generated during CRISPR gene editing, such as RNA-guided DNA endonucleases and target-specific guide RNAs (gRNAs).

Embodiments of the present disclosure are now described in detail with the understanding that such embodiments are exemplary only. Such embodiments constitute what the inventors now believe to be the best mode of practicing the technology. Those skilled in the art will recognize that such embodiments are capable of modification and alteration.

Methods of Performing Size Exclusion Chromatography

Disclosed herein is an improved size exclusion chromatography (SEC) method. The method includes using a chromatographic device having metallic flow path components having wetted surfaces, wherein at least a portion of its wetted surfaces comprise an organosilane coating as described herein. In some embodiments, the method further comprises using, in combination with the chromatographic device as described, a stationary phase material based on hydroxy-terminated PEG surface modified silica or hydroxy-terminated PEG surface modified inorganic-organic hybrid particles. In certain embodiments, use of metallic flow path components comprising an organosilane coating layer in combination with hydroxy-terminated PEG surface modified stationary phase materials for SEC is particularly advantageous in reducing secondary interactions of the analyte with the system as a whole.

The method generally comprises contacting a sample containing at least one analyte with an immobilized stationary phase material as described herein (e.g., in a column chromatography device as described herein), flowing a mobile phase through the stationary phase material for a period of time; and eluting the at least one analyte from the immobilized stationary phase in the mobile phase. Each of the stationary phase materials, the chromatographic device, the mobile phase, and the at least one analyte are described further herein below.

Stationary Phase Material

The disclosed method of performing size exclusion chromatography (SEC) utilizes a stationary phase material with a size-based affinity for the analyte. In some embodiments, the stationary phase material comprises porous particles having a surface, wherein at least some substantial portion thereof is modified with a hydroxy-terminated polyethylene glycol (PEG). The modified porous particles may be silica or inorganic-organic hybrid particles. A particularly suitable hydroxy-terminated PEG modified porous particle is that described in U.S. patent application Ser. No. 17/502,483 to DeLano et al., and 17/477,340 to Sarisozen et al., each of which is incorporated herein by reference in its entirety and for all purposes.

For use in SEC, generally, the stationary phase will be immobilized in a housing having a wall defining a chamber, for example, a column having an interior for accepting the stationary phase. Such columns will have a length and a diameter.

In some embodiments, the length of the column is about 300 mm. In some embodiments, the length of the column is about 150 mm. In some embodiments, the length of the column is less than about 300 mm, less than about 150 mm, less than about 100 mm, or less than about 50 mm. In some embodiments, the length of the column is about 50 mm, about 30 mm, about 20 mm, or about 10 mm.

In some embodiments, the column has a bore size of about 4.6 mm inside diameter (i.d.). In some embodiments, the column has a bore size of greater than 4.6 mm i.d. In some embodiments, the column has a bore size of about 7.8 mm i.d. In some embodiments, the column has a bore size of greater than 7.8 mm i.d. In some embodiments, the column has a bore size of greater than about 4 mm i.d., greater than about 5 mm i.d., greater than about 6 mm i.d., or greater than about 7 mm i.d.

The column has an interior wetted surface, wherein at least a portion of its wetted surface includes a hydrophilic, non-ionic coating layer comprising a polyethylene glycol silane as described herein below.

Chromatographic Device

In some embodiments, the disclosed method of performing SEC utilizes a chromatographic device comprising a sample injector having a sample injection needle configured for injecting a sample into a mobile phase, a sample reservoir in fluid communication with the sample injector, a chromatography column downstream of and in fluid communication with the sample injector, the chromatography column having fluid connectors and fluid conduits connecting the sample injector and the chromatography column, each of said fluid conduits, sample injector, sample reservoir, and chromatography column having interior surfaces, said interior surfaces forming a fluidic flow path having wetted surfaces, wherein at least a portion of the wetted surfaces comprise an organosilane coating as described herein below.

Figure 1:
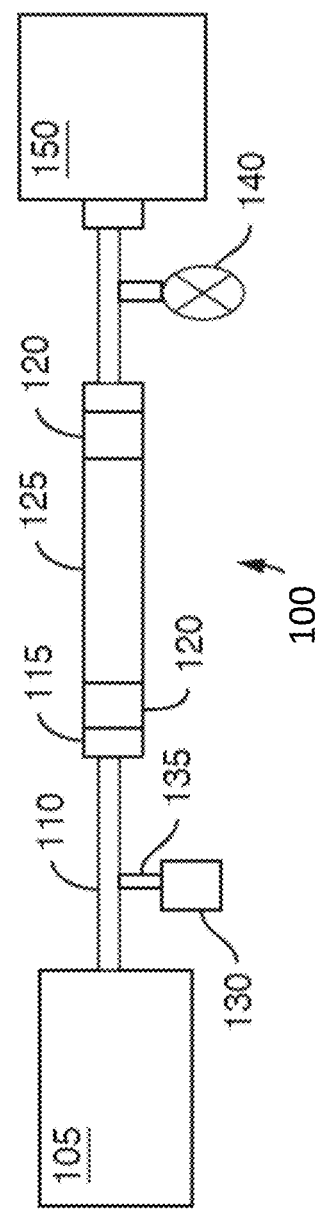
FIG. 1 is a schematic of a chromatographic flow system including a chromatography column and various other components, in accordance with an illustrative embodiment of the technology. A fluid is carried through the chromatographic flow system with a fluidic flow path extending from a fluid manager to a detector.

FIG. 1 is a representative schematic of a chromatographic flow system/device 100 that can be used to separate analytes in a sample. Chromatographic flow system 100 includes several components including a fluid manager system 105 (e.g., controls mobile phase flow through the system), tubing 110 (which could also be replaced or used together with microfabricated fluid conduits), fluid connectors 115 (e.g., fluidic caps), frits 120, a chromatography column 125, a sample injector 135 including a needle (not shown) to insert or inject the sample into the mobile phase, a vial, sinker, or sample reservoir 130 for holding the sample prior to injection, a detector 150 and a pressure regulator 140 for controlling pressure of the flow. Interior surfaces of the components of the chromatographic system/device form a fluidic flow path that has wetted surfaces. The fluidic flow path can have a length to diameter ratio of at least 20, at least 25, at least 30, at least 35 or at least 40. The detector 150, can be a mass spectrometer. The fluidic flow path can include wetted surfaces of an electrospray needle (not shown).

At least a portion of the wetted surfaces is coated with an organosilane coating to tailor its hydrophobicity and reduce or eliminate ionic interactions with e.g., certain analytes. In some embodiments, the organosilane coating is a two-carbon (C2) alkylsilane coating, such as that obtained by reaction of the wetted surface with e.g., bis(trichlorosilyl) ethane or bis(trimethoxysilyl) ethane. In some embodiments, at least some portion of the wetted surface comprises a coating that covers the metallic flow path.

The thickness of the coating may vary. In some embodiments, the coating has a thickness in a range from about 20 nm to about 1000 nm, or even about 2000 nm. In some embodiments, the coating is vapor deposited. In some embodiments, the coating consists of a single type of organosilane (e.g., alkylsilane) material. Such coatings and methods are described in, for example, U.S. Patent Application Publication No. 2019/0086371 to Lauber et al., incorporated herein by reference in its entirety. In some embodiments, the coating comprises multiple organosilane materials, optionally in different or multiple layers. In some embodiments, the organosilane coating comprises a hydrophilic and non-ionic layer, comprising a polyethylene glycol (PEG) silane. In some embodiments, the organosilane coating comprises a C2 alkylasilane layer and a hydrophilic, non-ionic layer, comprising a polyethylene glycol (PEG) silane. One such suitable polyethylene glycol silane coating and methods for preparing materials bearing such a coating are described in, for example, U.S. patent application Ser. No. 17/502,483 to DeLano et al., previously incorporated herein by reference.

As such, methods and devices of the present technology provide the advantage of being able to use high pressure resistant materials (e.g., stainless steel) for the creation of the flow system, but also the ability to tailor the wetted surfaces of the fluidic flow path to provide the appropriate hydrophobicity so deleterious interactions or undesirable chemical effects on the analyte can be minimized.

The organosilane coating can be provided throughout the system from the tubing or fluid conduits 110 extending from the fluid manager system 105 all the way through to the detector 150. The coatings can also be applied to portions of the fluidic fluid path. That is, one may choose to coat one or more components or portions of a component and not the entire fluidic path. For example, the internal portions of the column 125 and its frits 120 and end caps 115 can be coated whereas the remainder of the flow path can be left unmodified. Further, removable/replaceable components can be coated. For example, the vial or sinker 130 containing the sample reservoir can be coated as well as frits 120.

In some embodiments, the flow path of the fluidic systems described herein is defined at least in part by an interior surface of tubing. In another embodiment, the flow path of the fluidic systems described herein is defined at least in part by an interior surface of microfabricated fluid conduits. In another embodiment, the flow path of the fluidic systems described herein is defined at least in part by an interior surface of a column. In another embodiment, the flow path of the fluidic systems described herein is defined at least in part by passageways through a frit. In another embodiment, the flow path of the fluidic systems described herein is defined at least in part by an interior surface of a sample injection needle. In another embodiment, the flow path of the fluidic systems described herein extends from the interior surface of a sample injection needle throughout the interior surface of a column. In another embodiment, the flow path extends from a sample reservoir container (e.g. sinker) disposed upstream of and in fluidic communication with the interior surface of a sample injection needle throughout the fluidic system to a connector/port to a detector.

In some embodiments, at least a portion of the wetted surfaces of the fluidic flow path are coated with the organosilane coating. The organosilane coating is inert to at least one of the analytes in a sample, such as a biomolecule including, but not limited to, deoxyribonucleic acids (DNAs), ribonucleic acids (RNAs), proteins, polysaccharides, antibody-drug conjugates, glycans, sugar phosphates, and the like.

In some embodiments, only the wetted surfaces of the chromatographic column (i.e., interior column walls and associated frits) are coated with the organosilane coating. In some embodiments, only the wetted surfaces of the chromatographic column and the components located upstream of the chromatographic column are coated with the organosilane coating, while wetted surfaces located downstream of the column are not coated. In some embodiments, the entirety of the wetted surfaces of the fluidic flow path are coated with the organosilane coating. In embodiments which include components formed from metal within the fluidic path, a coating substantially covering (e.g., 98% or more) the metal from the fluidic path is provided. In general, the coating includes an organosilane coating. In certain embodiments, the organosilane coating is C2 or C2/PEG. In certain embodiments, the organosilane coating is C2/PEG.

In other embodiments, at least a portion of the wetted surfaces of the fluidic flow path are non-metallic, such as a polymeric material. In some embodiments, at least a portion of the wetted surfaces of the fluidic flow path comprise or are polyether ether ketone (PEEK).

Analyte

The method for performing size exclusion chromatography as disclosed herein utilizes a sample containing at least one analyte such as a biopharmaceuticals or proteinaceous analyte. In some embodiments, the at least one analyte comprises one or more biomolecules. In some embodiments, the biomolecule is a nucleic acid (e.g., RNA, DNA, oligonucleotide), protein (e.g., fusion protein), peptide, antibody (e.g., monoclonal antibody (mAb)), antibody-drug conjugate (ADC), polysaccharides, virus, virus-like particle, viral vector (e.g., gene therapy viral vector, adeno associated viral vector), biosimilar, or any combination thereof. In some embodiments, the at least one analyte comprises a nucleic acid which is an RNA, such as mRNA. In some embodiments, the analyte is a protein-free RNA.

In particular embodiments, the analyte comprises an RNA, a protein, or a ribonucleoprotein complex associated with Clustered Regularly Interspaced Short Palindromic Repeats (CRISPR)-based gene editing. For example, the analyte may comprise one or more CRISPR-associated (Cas) proteins, constructs, or complexes, such as those present in a CRISPR-Cas system.

CRISPR technology provides a relatively simple and efficient alternative for site-specific gene editing. CRISPR-Cas systems have revolutionized genomics by enabling efficient and precise genome editing in a wide variety of biological systems, including eukaryotic cells. CRISPR-Cas proteins are RNA-guided nucleases used to introduce double-stranded breaks (DSBs) at targeted genomic loci. DSBs are repaired by endogenous cellular pathways such as non-homologous end joining (NHEJ) and homology-directed repair (HDR). Providing an exogenous DNA template during repair allows for the intentional, precise incorporation of a desired mutation via the HDR pathway. Type II CRISPR-Cas systems require an RNA-guided DNA endonuclease and a target-specific guide RNA (gRNA) to generate a double-stranded break (DSB) at a desired genomic location, flanked by a short protospacer adjacent motif (PAM).

Cas proteins are represented by a bacterial origins and comprise a variety of amino acid sequences. The Cas9 endonuclease proteins are a particular set of CRISPR-associated proteins which are commonly employed for CRISPR gene editing. Among the various Cas 9 proteins employed for CRISPR gene editing, those having amino acid sequences derived from *Staphylococcus aureus* or *Streptococcus pyogenes* bacterial strains frequently utilized. The Cas9 proteins derived from each bacterial species share some sequence homology but are also unique in their primary sequences and residue lengths. Particularly, Cas9 protein encoded and expressed by *S. aureus* is smaller than the Cas9 protein encoded and expressed by *S. pyogenes* (1053 residues versus 1368 residues, respectively). Cas9 expressed by *Streptococcus pyogenes* (S.p. Cas9) is one of the most commonly used CRISPR enzymes for genome editing. However, by virtue of its smaller size, Cas9 expressed by *Staphylococcus aureus* can be more readily packaged into a viral vector, which can be advantageous when transfecting and genetically engineering cells. The present technology and its methodologies are not limited to these particular Cas9 protein molecules.

Association of Cas9 protein with a gRNA forms a ribonucleoprotein (RNP) complex, which surveys a dsDNA substrate and generates a DSB when its complementary target sequence with a PAM sequence 3' of that target is recognized by an active Cas9 RNP complex. Cas9 contains two endonuclease domains (HNH and RuvC) that function together to generate a blunt DSB by each domain cleaving opposite DNA strands. RuvC cleaves the DNA strand non-complementary to the spacer sequence and HNH cleaves the complementary strand. Together, these domains generate double-stranded breaks (DSBs) in the target DNA. Inactivating one of the two endonuclease domains results in Cas9 variants called "nickases": the RuvC-inactive variant (Cas9 D10A) nicks the target (gRNA complementary) strand, while the HNH-inactive variant (Cas9 H840A) nicks the non-target (gRNA non-complementary) strand. Cas9 nickases can be used with an individual guide to induce single DNA nicks and induce a repair pathway termed alternative-HDR. The native gRNA for Cas9 is hybridized from two RNA molecules: a CRISPR RNA (crRNA) and a universal, trans-activating crRNA (tracrRNA) which forms a duplex with the crRNA that together guide Cas9 to its target DNA. The two components of the native gRNA can also be combined as a single, unimolecular structure to form a single-guide RNA (sgRNA). This sgRNA guides the CRISPR/Cas9 complex to its intended genomic location. Cas12a enzymes are also RNA-guided double-stranded DNA nucleases (Type V CRISPR-Cas systems) that provide an alternative to the commonly used S.p. Cas9 nuclease with similar editing outcomes.

In some embodiments, the at least one analyte comprises a CRISPR-associated (Cas) protein, a CRISPR-related construct, or CRISPR-related complex as described herein above. Such analytes include, but are not limited to, Cas proteins, single-stranded oligodeoxynucleotide (ssODN) templates, ribonucleoprotein (RNP) complexes, nickases, crRNAsthat define complementarity, trans-activating CRISPR RNA (tracrRNA), single-guide RNA (sgRNA), and the like. In some embodiments, the analyte comprises a Cas protein, such as Cas9 or Cas12a. In some embodiments, the analyte comprises a Cas protein complexed to an RNA. In some embodiments, the analyte comprises a protein-free RNA.

According to the present disclosure, it was surprisingly found that utilizing an embodiment of the separation method disclosed herein (i.e., using a hydroxy-terminated PEG surface modified porous hybrid particle stationary phase, combined with a chromatography system including a wetted fluidic path at least partially modified with an organosilane coating, each as described herein), achieved clean SEC separation of a sample comprising Cas9 protein and recombinant albumin (rAlbumin). In contrast, using a state-of-the-art reference column (diol bonded SEC mAb), Cas9 protein was unrecovered, and the baseline elevation consisted of higher order aggregates of the recombinant albumin. See Example 1 and FIGS. 2A and 2B.

Accordingly, in some embodiments, the at least one analyte comprises a Cas9 protein. Further contemplated herein are variants of Cas9 protein (i.e., natural or intentionally altered variant mutations), as well as Cas9 obtained from various sources including, but not limited to, *Streptococcus* and *Staphylococcus* sp. (e.g., *pyogenes* and *canis*, or *aureus*, respectively). In some embodiments, the analyte comprises a Cas9 protein expressed by or derived from *Staphylococcus aureus* or *Streptococcus pyogenes*. In some embodiments, the Cas9 protein does not comprise an affinity handle. In some embodiments, the Cas9 protein comprises an affinity handle. In some embodiments, the affinity handle comprises histidine residues. In some embodiments, the affinity handle is hexa-histidine. In some embodiments, the Cas9 protein is monomeric. In some embodiments, a portion of the CAs9 protein is present in the form of one or more aggregates. In some embodiments, the methods disclosed herein differentiate and/or quantitate monomeric versus aggregated Cas9 proteins. In some embodiments, the methods disclosed herein differentiate and/or quantitate both free and unbound Cas9 proteins, mRNA's, or both.

Mobile Phase

The method for performing SEC as disclosed herein comprises flowing a mobile phase through an immobilized stationary phase as described herein for a period of time. The mobile phase comprises generally comprises water, a buffer, and optionally one or more salts. In certain specific embodiments, the mobile phase and, optionally the sample, are provided by a high-performance liquid chromatography (HPLC) system.

Buffers serve to control the ionic strength and the pH of the mobile phase. Many different substances may be used as buffers depending on the nature of the analyte. Non-limiting examples of suitable buffers include phosphates, tris(hydroxymethyl)aminomethane, and acetates. In some embodiments, the buffer comprises phosphate. In some embodiments, the buffer comprises acetate. In some embodiments, the buffer is ammonium acetate. In some embodiments, the buffer is an alkali metal phosphate. In some embodiments, the buffer is a sodium or potassium phosphate. In some embodiments, the buffer is sodium phosphate monobasic, sodium phosphate dibasic, or a combination thereof.

The concentration of the buffer may vary depending on the desired pH and ionic strength of the mobile phase. In some embodiments, the buffer is present at a concentration from about 5 to about 500 mM, such as from about 5, about 10, about 20, about 20, about 40, about 50, about 60, about 70, about 80, about 90, or about 100 mM, to about 200, about 300, about 400, or about 500 mM.

The pH of the mobile phase may vary. In some embodiments, the pH value of the mobile phase is from about 5.0 to about 10.0, such as from about 5.0 to about 8.0. In some embodiments, the pH value of the mobile phase is from about 6.0 to about 7.5. In some embodiments, the pH is from about 6.0, or about 6.5, to about 7.0, or about 7.5. In some embodiments, the pH is about 6.0, about 6.1, about 6.2, about 6.3, about 6.4, about 6.5, about 6.6, about 6.7, about 6.8. about 6.9, about 7.0, about 7.1, about 7.2, about 7.3, about 7.4, or about 7.5. In some embodiments, the pH is about 7.0

In some embodiments, the mobile phase comprises a salt. As used herein, the term "salt" refers to an ionic compound comprising an alkali or alkaline earth metal and a halogen (e.g., fluoride, chloride, bromide, iodide). Undesired interactions can be mitigated through utilizing a salt to reduce ionic secondary interactions. However, increasing the salt concentration can induce aggregation and thus lead to a decrease in native monomer, and the addition of high concentrations of salt can exacerbate hydrophobic interactions, and complicates mobile phase optimization. When present, suitable salts include, but are not limited to, sodium chloride and potassium chloride. Suitable concentrations of salts in the mobile phase may range from about 10 to about 500 mM.

In some embodiments, the mobile phase comprises an organic co-solvent. Organic co-solvents such as methanol, ethanol, isopropanol or acetonitrile are common additives to SEC mobile phases. When present, a co-solvent, such as acetonitrile, is generally present at less than about 15% by volume in the mobile phase. In some embodiments, the mobile phase comprises an organic co-solvent in an amount up to about 15% by volume in the mobile phase. In some embodiments, the co-solvent is acetonitrile. In some embodiments, the acetonitrile is present in an amount from about 5 to about 15% by volume.

Conditions

Flow Rate

The separation method as disclosed herein may be conducted by flowing the mobile phase through the stationary phase at a variety of different flow rates, which may be determined by one of skill in the art based on scale, stationary phase particle size, difficulty of separation, and the like. In some embodiments, flowing the mobile phase through the immobilized stationary phase is performed at a flow rate from about 0.2 mL/min to about 3 mL/min. In certain embodiments, the flow rate is about 1 mL/min. In some embodiments, the flow rate is about 2 mL/min. In some embodiments, the flow rate is about 3 mL/min. In some embodiments, the flow rate is less than 1 mL/min, such as from about 0.05, about 0.1, about 0.2, about 0.3, about 0.4, or about 0.5, to about 0.6, about 0.7, about 0.8, about 0.9, or about 1 mL/min. In some embodiments, the flow rate is about 0.35 mL/min.

Temperature

The temperature at which the chromatography is performed (i.e., column temperature) may vary. In some embodiments, the column temperature is from about 20 to about 50° C., such as about 20, about 25, about 30, about 35, about 40, about 45, or about 50° C.

Time

The time required for the SEC separation will vary depending on many factors, but will generally be less than about 60 minutes, less than about 50 minutes, less than about 40 minutes, less than about 30 minutes, less than about 20 minutes, less than about 10 minutes, less than about 5 minutes, less than about 4 minutes, less than about 3 minutes, less than about 2 minutes, or less than about 1 minute. In particular, the time will be determined by the elution time of the analyte of interest. In some embodiments, the retention time is reproducible from run to run, and is relatively unaffected by changes in temperature, pH, buffer concentration, and the like.

Detecting

In some embodiments, the method further comprises detecting the presence or absence of the at least one analyte in the sample. Many suitable options exist for methods of detection. In some embodiments, the detecting is performed using a refractive index detector, a UV detector, a light-scattering detector, a mass spectrometer, or combinations thereof. In specific embodiments, the detecting is performed using a UV detector. Numerous detectors are available; however, a specific detector is a Waters ACQUITY™ UPLC™ Tunable UV Detector (Waters Corporation, Milford, Mass., USA).

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein.

Although the technology herein has been described with reference to particular embodiments, it is to be understood that these embodiments are merely illustrative of the principles and applications of the present technology. It will be apparent to those skilled in the art that various modifications and variations can be made to the method and apparatus of the present technology without departing from the spirit and scope of the technology. Thus, it is intended that the present technology include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the technology. Thus, the appearances of phrases such as "in one or more embodiments," "in certain embodiments," "in one embodiment" or "in an embodiment" in various places throughout this specification are not necessarily referring to the same embodiment of the technology. Furthermore, the particular features, structures, materials, or characteristics may be combined in any suitable manner in one or more embodiments. Any ranges cited herein are inclusive.

Aspects of the present technology are more fully illustrated with reference to the following examples. Before describing several exemplary embodiments of the technology, it is to be understood that the technology is not limited to the details of construction or process steps set forth in the following description. The technology is capable of other embodiments and of being practiced or being carried out in various ways. The following examples are set forth to illustrate certain aspects of the present technology and are not to be construed as limiting thereof.

EXAMPLES

The present invention may be further illustrated by the following non-limiting examples describing the chromatographic devices and methods.

Materials

All reagents were used as received unless otherwise noted. Those skilled in the art will recognize that equivalents of the following supplies and suppliers exist and, as such, any suppliers listed below are not to be construed as limiting.

Example 1. SEC Separation of Cas9 Protein and Recombinant Albumin

The discovery and development of CRISPR/Cas9 altered the way genetic aberrations may be approached, specifically, by correcting a non-functional gene rather than replacing it entirely, or by disrupting an aberrant pathogenic gene. Thus CRISPR/Cas9 is a powerful tool providing extensive opportunities for programmable gene editing and may lead to valuable therapies for genetic diseases and disorders. Recently, limited trials of CRISPR gene therapies have been approved by the FDA where the benefit is believed to outweigh potential risks. Accordingly, robust separation methods for purification and analysis of proteins, nucleotides, and complexes will be needed to support development and commercialization of such therapies. SEC is a potentially valuable separation modality, but traditionally, SEC separations of biomolecules suffers from undesirable secondary interactions. Accordingly, it is desirable in the art to provide methods and materials for performing such separations with improved performance with respect to such secondary interactions (e.g., reduced hydrophobic and ionic interactions).

Toward this end, separations of Cas9 protein (EnGen® Sau Cas9 nuclease, *S. aureus*; 127 kDa molecular weight; including a hexa-histidine tag; available from New England Biolabs, Ipswich, MA, USA) diluted with 100 µL recombinant albumin buffer, were performed using a commercially available column according to an embodiment of the disclosure (XBridge™ Premier Protein SEC Column; hydroxy-terminated PEG surface modified hybrid particle, 250 Å pore size, 2.5 µm particle size, 4.6×300 mm; available from Waters Corporation, Milford, MA). For comparison, separations were also performed on a state-of-the-art reference column (BioResolve™ SEC mAb Column, diol bonded, 2.5 µm, 4.6×300 mm; available from Waters Corporation, Milford, MA).

Method

The separations were performed using a commercially available high performance liquid chromatography (HPLC) system (ACQUITY™ UPLC™ H-Class Bio System; available from Waters Corporation, Milford, MA). The system comprised a QSM with 100 µL Mixer, TUV Detector (Flow cell: Titanium, 5 mm, 1500 nL), FTN-SM with 15 µL MP35N Needle pn700005421, CH-30A heater with an Active Preheater 18.5" pn 205001755 and post-column tubing to TUV: 0.005" ID×22.5" LG MP35N Welded Tube pn 700008914. The instrument parameters are provided in Table 1.

TABLE 1

| Instrument Test Parameters | |
|---|---|
| Data Acquisition and Analysis: | Empower™ 3 Software |
| Columns: | XBridge™ Premier Protein SEC 250 Å 2.5 µm Column, 4.6 × 300 mm (hydroxyl-terminated polyethylene glycol stationary phase chemistry); Reference Column (BioResolve™ SEC mAb Column 2.5 µm, 4.6 × 300 mm; Diol stationary phase chemistry) |

TABLE 1-continued

Instrument Test Parameters

| | |
|---|---|
| Temperature: | 35° C. |
| Seal Wash: | 10% HPLC grade Methanol/90% 18.2 MΩ water (v/v) (Seal Wash interval set to 0.5 min) |
| Sample Manager Washes: | 18.2 MΩ water |
| Mobile Phase: | 2X Phosphate Buffered Saline (Sigma P/N P3813; 20 mM Phosphate, 276 mM NaCl, 5.4 mM KCl, pH 7.4) |
| Active Preheater: | Enabled in ACQUITY-FTN method |
| QSM Accelerate to 2 mL/min: | 5 min (0.4 mL/min/min) in QSM method misc tab |
| Flow Rate: | Mobile phase A, 0.200 mL/min |
| "0" Injection Volume Lines Flow Rates: | Refer to example Sample Set |
| Sample Temperature: | 8° C. |
| Sample: | EnGen ® Sau Cas9 diluted with 100 µL rAlbumin Buffer |
| Injection Volume: | 3 µL |
| Syringe Draw Rate: | 30 µL/min |
| Needle Placement: | 1.0 mm |
| Data Channels: | System Pressure and TUV |
| UV Wavelength: | 280 nm |
| TUV Sampling Rate: | 5 Hz (Recommended) |
| Filter Time Constant: | none |
| Data Mode: | Absorbance |
| Autozero On Inject Start: | Yes and at 4.5 min |
| Autozero On Wavelength: | Maintain Baseline |

Figure 2A:
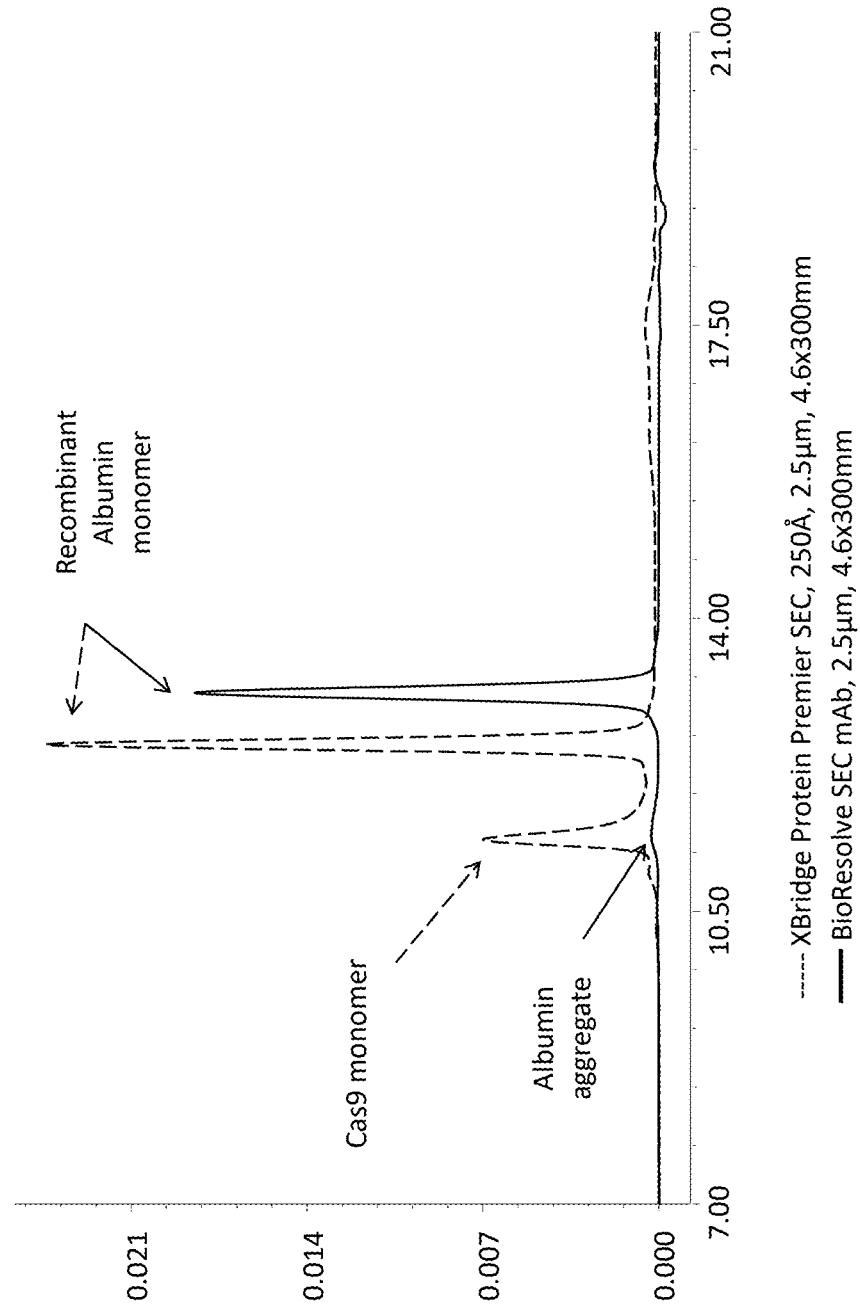

An overlay of exemplary SEC chromatograms is provided in FIGS. 2A and 2B. With reference to FIG. 2A, the overlay of two columns with different stationary phases (reference and surface modified). Specifically, the chromatogram with the solid line is a chromatogram for the separation performed with the reference column having conventional stainless-steel column hardware, while the solid line is a chromatogram for the separation performed with a surface modified stationary phase column having C2/PEG coated hardware, both according to an embodiment of the disclosure.

With continued reference to FIG. 2A, and FIG. 2B (expanded view relative to FIG. 2A), the chromatogram for the reference diol-based column showed no detection of the Cas9 monomer or aggregates, only the presence of the recombinant albumin monomer and higher order aggregates at 11.40 and 13.11 minutes, respectively. Conversely, when separation of the same sample, using the same mobile phase and chromatographic conditions, but using the surface modified stationary phase and C2/PEG coated column hardware, the Cas9 protein monomer and higher order aggregates were detected at 11.36 and 10.96, respectively. Additionally, the recombinant albumin monomer was also detected at 12.49 minutes.

The data provided in FIGS. 2A and 2B demonstrate the significant and surprising advantages of the disclosed method relative to the current state of the art separation technology (i.e., diol bonded column), which notably failed to detect the presence of the Cas9 protein.

Example 2. SEC Separations of Cas9 Protein and Recombinant Albumin-Various Stationary Phases Separations of Cas9 protein (EnGen® Sau Cas9 nuclease, *S. aureus;* 127 kDa molecular weight; including a hexa-histidine tag; available from New England Biolabs, Ipswich, MA, USA) diluted with 100 µL recombinant albumin buffer, were performed using a commercially available column according to an embodiment of the disclosure (XBridge™ Premier Protein SEC Column; hydroxy-terminated PEG surface modified hybrid particle, 250 Å pore size, 2.5 µm particle size, 4.6×150 mm; available from Waters Corporation, Milford, MA). For comparison, separations were also performed on three state-of-the-art reference columns as follows:

BioResolve™ SEC mAb Column, diol bonded, 2.5 µm, 4.6×150 mm; available from Waters Corporation, Milford, MA;

AdvanceBio SEC 300 Å 2.7 µm, 4.6×150 mm; Methoxy terminated polyethylene oxide (MeO-PEO) stationary phase available from Agilent Technologies, Inc., Santa Clara, CA; and TSKgel UP-SW3000, 2 µm, 4.6×150 mm; 250 Å diol stationary phase; available fromTOSOH Biosciences LLC, King of Prussia, PA.

The separations were performed using the system components and parameters as described in Example 1.

An overlay of exemplary SEC chromatograms is provided in FIGS. 3A and 3B. With reference to FIG. 3A, the overlay of four columns with different stationary phases (reference and surface modified). Specifically, the chromatogram with the solid line is a chromatogram for the separation performed with a surface modified stationary phase and C2/PEG coated column/frit, both according to an embodiment of the disclosure, the dashed line is a chromatogram for the separation performed on the MeO-PEO column, the dotted line is a chromatogram for the separation performed on the diol column, and the dashed and dotted line is a chromatogram for the separation performed on the reference BioResolve™ SEC mAb column. Each of the reference columns utilized conventional stainless steel column hardware.

With continued reference to FIG. 3A, and FIG. 3B (expanded view relative to FIG. 3A), the chromatograms showed that Cas9 monomer and aggregate recoveries were pronounced with the inventive XBridge™ Premier Protein SEC Column. Cas9 monomer and aggregate recoveries were greatly reduced for the MeO-PEG phase relative to the inventive column, and the diol bonded phase columns both showed extremely poor recovery.

Example 3. SEC Separation of Cas9 Protein-Coated and Uncoated Column

Separations of Cas9 protein (EnGen® Sau Cas9 nuclease, *S. aureus;* 127 kDa molecular weight; including a hexa-histidine tag; available from New England Biolabs, Ipswich, MA, USA) were performed using a commercially available column according to an embodiment of the disclosure (XBridge™ Premier Protein SEC Column; hydroxy-terminated PEG surface modified hybrid particle, 250 Å pore size, 2.5 µm particle size, 4.6×150 mm; column interior and frit coated with C2/PEG; available from Waters Corporation, Milford, MA) and an XBridge™ Protein SEC Column; hydroxy-terminated PEG surface modified hybrid particle, 250 Å pore size, 2.5 µm particle size, 4.6×150 mm; uncoated column). The separations were generally performed using the system components and parameters as described in Example 1, but the injection volume was 0.5 µL.

Figure 4B:
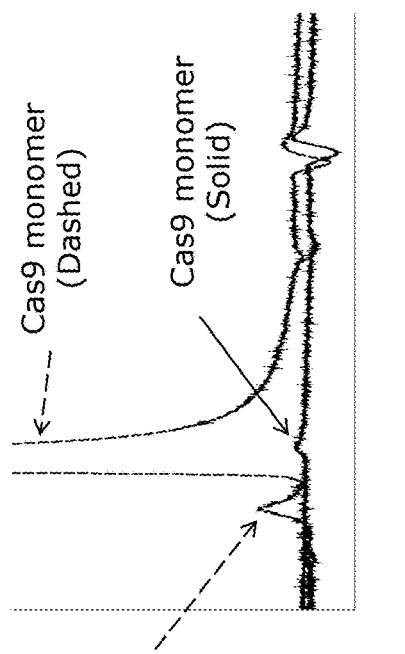
FIGS. 4A and 4B depict exemplary chromatographic separation of Cas9 protein performed on a reference diol bonded stationary phase column, and an exemplary chromatographic separation of Cas9 protein performed on a novel, hydroxy-terminated PEG surface-modified, inorganic-organic hybrid particle stationary phase SEC column according to an embodiment of the disclosure, the column interior and frit having a coating according to an embodiment of the disclosure (i.e., comprising a hydrophilic, non-ionic C2/PEG coated surface).
Figure 4A:
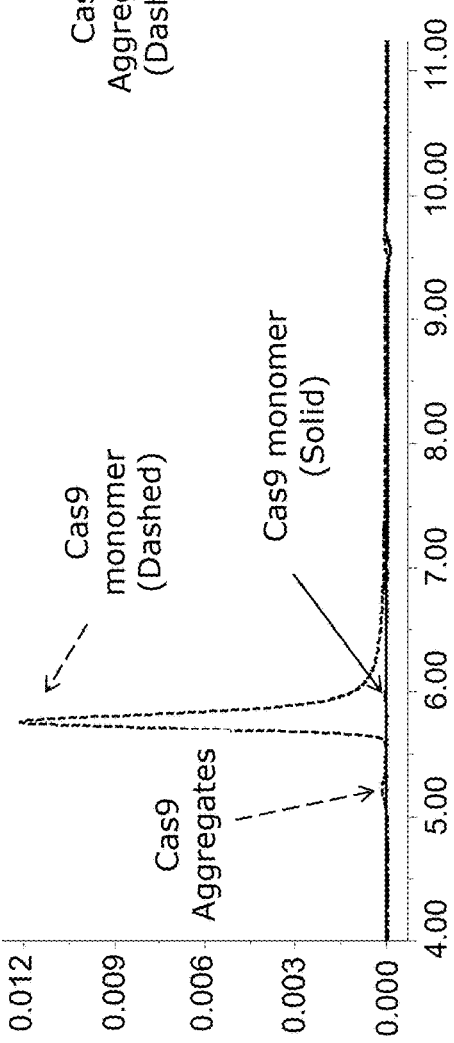

An overlay of exemplary SEC chromatograms is provided in FIGS. 4A and 4B. With reference to FIG. 4A, the solid line is a chromatogram for the separation performed with the uncoated column, and the dashed line is a chromatogram for the separation performed on the coated column. With continued reference to FIG. 4A, and FIG. 4B (expanded view relative to FIG. 4A), the chromatograms showed that Cas9 monomer and aggregate recoveries were observed with the XBridge™ Premier Protein SEC (C2/PEG coated) column (dashed line) but were minimal with the uncoated XBridge™ Protein SEC column (solid line). Without wishing to be bound by theory, it is believed that recovery of the Cas9 protein on the XBridge™ Premier Protein (coated) column may be the result of a synergistic combination of the hydrophilic hydroxy-terminated PEG surface modified stationary phase and the C2/PEG coated column hardware.

Example 4. SEC Separations of Two Different Cas9 Proteins

Separations of two different tagless Cas9 proteins (TrueCut™ HiFi Cas9 nuclease, and Cas9 nuclease protein NLS) were performed. The TrueCut™ HiFi Cas9 was obtained from Invitrogen/ThermoFisher Scientific (Waltham, MA, USA) as a 1 µg per mL solution. The TrueCut™ HiFi Cas9 is an engineered high fidelity Cas9 protein and has 163 kDa molecular weight. The Cas9 nuclease protein NLS was obtained from Dharmacon/Horizon (Lafayette, CO, USA) as a 10 µg per mL solution. The Cas9 nuclease protein NLS contains the *S. pyogenes* Cas9 (Csn1) gene with a C-terminal nuclear localization signal (NLS) and has 160 kDa molecular weight. Both of these Cas9 proteins differ from the Cas9 protein utilized in Examples 1-3 in that they do not contain a hexa-histidine tag.

Figure 5A:
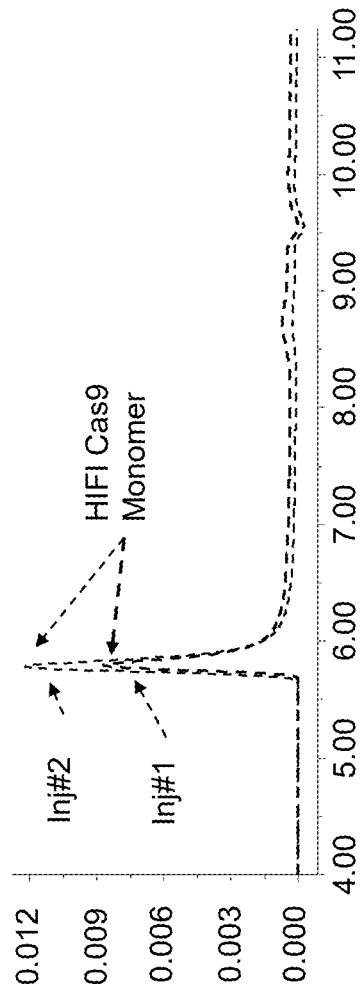
FIG. 5A depicts exemplary chromatographic separations of an engineered, high fidelity, tagless Cas9 protein performed on a novel, hydroxy-terminated PEG surface-modified, inorganic-organic hybrid particle stationary phase SEC column according to an embodiment of the disclosure, the column interior and frit having a coating according to an embodiment of the disclosure (i.e., the column and frit comprising a hydrophilic, non-ionic C2/PEG coated surface).
Figure 5B:
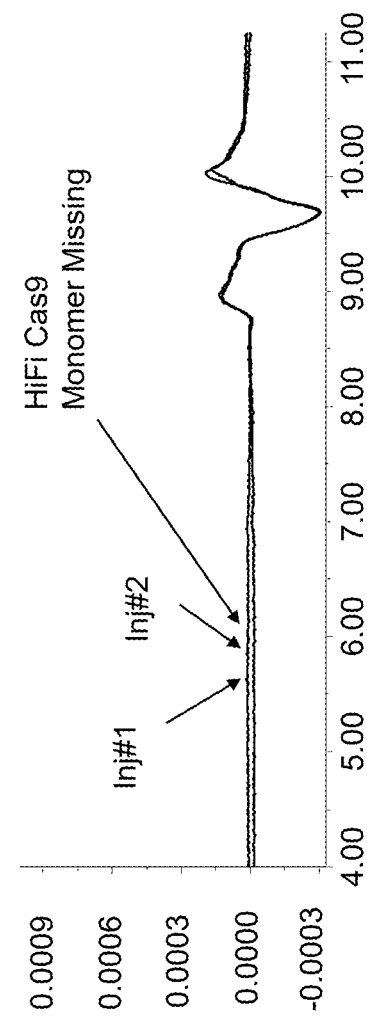
FIG. 5B depicts exemplary chromatographic separations of an engineered, high fidelity, tagless Cas9 protein performed on a reference diol bonded stationary phase column.

The separations were performed using a commercially available column according to an embodiment of the disclosure (XBridge™ Premier Protein SEC Column; hydroxy-terminated PEG surface modified hybrid particle, 250 Å pore size, 2.5 µm particle size, 4.6×150 mm; column interior and frit coated with C2/PEG; available from Waters Corporation, Milford, MA) and a reference column (BioResolve™ SEC mAb Column 2.5 µm, 4.6×150 mm; diol stationary phase chemistry) The separations were generally performed using the system components and parameters as described in Example 1. The injection volume was 2.5 µL for each Cas9 protein sample. The NLS Cas9 was diluted to a 5 µg/µL concentration prior to injection. Exemplary SEC chromatograms for two injections each of the TrueCut™ HiFi Cas9 protein on the XBridge™ and reference BioResolve™ columns are provided in FIGS. 5A and 5B, respectively. With reference to FIG. 5B, no recoveries were obtained on the reference BioResolve column after two injections. In contrast, the XBridge™ Premier Protein column demonstrated good recovery of the Cas9 monomer after a single injection. (FIG. 5A). Without wishing to be bound by theory, it is believed that the HiFi Cas9 protein recovery is affected by either or both of the hardware state (coated vs. uncoated) and the stationary phase material (diol vs. hydroxy-terminated PEG surface modified hybrid particles).

Exemplary SEC chromatograms for two injections each of the Cas9 NLS protein on the XBridge™ and reference BioResolve™ columns are provided in FIGS. 5C and 5D, respectively. With reference to FIG. 5D, moderate recovery was observed with the BioResolve column after two injections. In contrast, the XBridge™ Premier Protein column demonstrated both good recovery and reproducibility of the Cas9 monomer after one and two injections, respectively (FIG. 5C). These results show that recovery of the highly negatively charged Cas9 proteins appears to be diminished by ionic interactions between the Cas9 proteins and metallic surfaces in the flow path, and that coated (e.g., C2 or C2/PEG) or non-metallic wetted surfaces are necessary to achieve acceptable recovery of Cas9 proteins.

Example 5. SEC Separations of Three Different Cas9 Proteins; Coated and Uncoated Column Hardware with Diol Bonded Stationary Phase Separations of four different Cas9 protein analytes were performed. The Cas9 proteins were as follows:
tagless TrueCut™ HiFi Cas9 nuclease;
tagless Cas9 nuclease protein Horizon NLS;
hexa-histidine tagged EnGen® Sau Cas9 nuclease; and
hexa-histidine tagged EnGen® Sau Cas9 nuclease plus 100 µL rAlbumin The separations were performed using either a commercially available reference column (BioResolve™ SEC mAb Column 2.5 µm, 4.6×150 mm; diol stationary phase chemistry), or the stationary phase material of the BioResolve™ SEC mAb column packed into a stainless-steel column with frit, each coated with C2/PEG as described herein. The separations were generally performed using the system components and parameters as described in Example 1. The injection volume was 2.5 µL for each Cas9 protein sample. The NLS Cas9 was diluted to a 5 µg/µL concentration prior to injection.

Exemplary SEC chromatograms for two injections each of the four samples on the coated and uncoated columns is provided in FIGS. 6A-6H.

A chromatogram showing the recovery of the HiFi Cas9 monomer on the diol bonded stationary phase in the coated column is provided in FIG. 6A. In contrast, no recovery of the HiFi Cas9 monomer was observed on the diol bonded stationary phase in the uncoated column (FIG. 6B).

A chromatogram showing the recovery of the NLS Cas9 monomer on the diol bonded stationary phase in the coated column is provided in FIG. 6C. Poor recovery of the NLS Cas9 monomer on the diol bonded stationary phase in the uncoated column was observed as shown in FIG. 6D. With reference to FIG. 6D, no recovery of the Cas9 monomer was observed for injection #1.

A chromatogram showing the recovery of the Sau Cas9 monomer on the diol bonded stationary phase in the coated column is provided in FIG. 6E, which demonstrates similar recovery for injections 1 and 2. Poorer recovery of the Sau Cas9 monomer on the diol bonded stationary phase in the uncoated column was observed as shown in FIG. 6F. With reference to FIG. 6F, recovery increased with each of four injections.

A chromatogram showing the recovery of the Sau Cas9 monomer in the presence of recombinant albumin monomer on the diol bonded stationary phase in the coated column is provided in FIG. 6G, which demonstrates similar recovery for injections 1 and 2. Poorer recovery of the Sau Cas9 monomer in the presence of recombinant albumin monomer on the diol bonded stationary phase in the uncoated column was observed over two injections as shown in FIG. 6H.

Overall, Cas9 protein recoveries were observed to be significantly impacted by uncoated metal surface. In contrast, C2/PEG coated metal surfaces were inert to the negatively charged Cas9 proteins, and separations performed on the diol stationary phase with coated hardware showed excellent recoveries of all three Cas9 protein variants (synthetic Cas9, *S. pyogenes* Cas9, and *S. aureus* Cas9 species).

Example 6. SEC Exploration of *Streptococcus pyogenes* Cas9 Nuclease Protein Sample Preparation Cas9 Nuclease Protein NLS (Dharmacon/Horizon) containing the *Streptococcus pyogenes* Cas9 (Csn1) gene at a concentration of 10 µg/µL was diluted with deionized water to 5 µg/µL to provide a SpCas9 solution.

A buffered aqueous phosphate solution was prepared (20 mM Phosphate, 276 mM NaCl, 5.4 mM KCl pH 7.4) and filtered prior to use through a sterile 0.2 µm nylon filter.

A solution of buffered aqueous acetonitrile was prepared (320 mM Ammonium Acetate, pH 8.5 in 4% CAN).

LC Conditions
- LC system: ACQUITY™ UPLC™ H-Class Bio
- Detection: ACQUITY UPLC TUV Detector (Titanium Flow Cell, 5 mm, 1500 nL)
- Wavelength: 280 nm (Cas9 samples) and 260 nm (RNP Formation)
- Data acquisition: Empower™ Pro 3 Feature Release 3
- Column(s): XBridge™ Premier Protein SEC 250 Å, 2.5 µm, 4.6×150 mm
- ACQUITY Premier Protein SEC 250 Å, 1.7 µm, 4.6×300 mm
- Column temperature: 35° C.
- Sample temperature: 8° C.
- Sample manager washes: 18.2 MΩ water
- Seal wash: 10% HPLC grade Methanol/90% 18.2 MΩ water (v/v)
- Injection volume: gRNA (2 µL of 5 µg/µL); RNP Formation (2 µL of 1:1 and 3:1 complex)
- Flow rate: 0.2 mL/min
- Mobile phase A: 2X PBS: Phosphate Buffered Saline (20 mM Phosphate, 276 mM NaCl, 5.4 mM KCl pH 7.4)
- Sample(s): Cas9 Nuclease Protein NLS
- Gradient: Isocratic SEC-MS
- LC system: ACQUITY Premier Binary Solvent Manager
- Detection: ACQUITY UPLC TUV Detector (Titanium Flow Cell, 5 mm, 1500 nL)
- Wavelength: 280 nm
- Data acquisition MassLynx™ v4.1
- Column(s): ACQUITY Premier Protein SEC 250 Å, 1.7 µm, 4.6×150 mm
- Column temperature: 30° C.
- Sample temperature: 8° C.
- Seal wash and FTN SM washes: 10% HPLC grade Methanol/90% 18.2 MΩ water (v/v)
- Injection volume: SpCas9 (10 µL) Flow rate: 0.1 mL/min
- Mobile phase A: 320 mM Ammonium Acetate, pH 8.5 in 4% ACN
- Sample(s): Cas9 Nuclease Protein NLS (SpCas9)
- MS system: Xevo™ G2-XS QToF
- Quadrupole settings: 1000/2000/3940 25%/25%/25%/25%
- Acquisition window: 2000 to 7000 m/z
- Capillary: 3 kV
- Scan rate: 2 Hz
- Source temperature: 100° C.
- Desolvation gas flow: 600 L/Hr
- Desolvation gas temperature: 450° C.
- Cone gas flow: 50 L/Hr Results Experiments were first performed to compare the peak shape and recovery of SEC columns prepared with Protein SEC 250 Å packing material and standard metallic hardware versus h-HPS modified hardware. Specifically, the performance of conventional stainless-steel column hardware was compared to that of MaxPeak High Performance Surfaces (h-HPS) column hardware using 4.6×300 mm dimensions and the same packing (hydroxy-terminated BEH 250 Å, 2.5 µm). The chromatograms obtained are provided as FIG. 7A and FIG. 7B (enhanced view relative to FIG. 7A), which demonstrate that the highly concentrated electrostatic binding sites of a typical CRISPR Cas9 protein appear to have led to adsorptive losses on the conventional stainless-steel hardware. There was a sizable difference in the performance between conventional stainless-steel and h-HPS hardware. With reference to FIGS. 7A and 7B, h-HPS column hardware with BEH-PEO particles minimized the electrostatic interactions of SpCas9 with the hardware, while use of conventional stainless-steel column hardware made recovery of the SpCas9 nearly impossible. Even with h-HPS hardware, there was a small indication of conditioning; that is, aggregate recovery increased upon the second versus first injection (blue trace). Nevertheless, the first injection on the h-HPS column produced excellent recovery of the monomeric SpCas9 protein. In view of the promising performance of the column/coated hardware, this combination was selected for additional evaluation on SpCas9 protein SEC and an investigation into the formation and chromatographic behavior of RNP complexes as described herein below.

Example 7. SEC of a Ribonucleoprotein (RNP) Complex and Its Components

During formation of RNP complexes, it is essential to quickly assess the stability of compounds during and after the complexation. To explore the potential to perform this analysis by SEC, the formation of RNPs was studied by SEC.

An RNP complex was formed by first incubating sgRNA (Edit-R Synthetic sgRNA Non-targeting Control #1; Dharmacon/Horizon) at 60° C. for ten minutes and allowing to cool to room temperature for fifteen minutes. RNP complex mixtures of heated sgRNA to SpCas9 solution (1:1 and a 3:1) were then prepared and mixed gently by vortex. The mixtures (300 µL volume) were then centrifuged at 8000 rpm for thirty seconds and transferred to screw neck vials.

SEC was performed using phosphate buffered saline as mobile phase on an ACQUITY Premier Protein SEC 250 Å 1.7 µm, 4.6×300 mm column. The results from these studies are provided in FIGS. 8A-8D, which provide SEC-UV traces for individual sgRNA, individual SpCas9, and RNP complexes resulting from 1:1 and 3:1 mixtures of sgRNA and SpCas9, respectively. FIG. 8A provides an SEC-UV chromatogram of engineered sgRNA having a molecular weight of ~32 kDa. The chromatogram was acquired with UV detection (260 nm) to more selectively monitor nucleic acid elution. FIG. 8B presents an SEC-UV 280 nm chromatogram for SpCas9 and a corresponding monomeric peak eluting at 11.34 minutes. In FIG. 8C, the result of a 1:1 mixture of sgRNA to SpCas9 is provided. RNP complexes were observed to be partially formed as evidenced by the presence of new peaks eluting between 9.00 minutes and 11.09 minutes. Without wishing to be bound by theory, it is believed that the shifted elution time of these RNP peaks is due to the increased hydrodynamic radii of the combined protein-RNA complexes. A small portion of SpCas9 protein was observed to be unbound at this ratio of 1:1 as observed by a shoulder on RNP complex peak. In FIG. 8D, the ratio of the sgRNA was tripled to a 3:1 ratio, which appears to have produced an abundance of signal for free sgRNA. With the excess amount of sgRNA, there also appeared to be a commensurate decrease in the unbound SpCas9 shoulder peak. These results suggest that SEC-UV analysis can be implemented as a quick check on RNP complexation and as a tool to monitor its stability.

Example 8. Volatile Mobile Phases and SEC-MS

For heightened characterization of a Cas protein and its complexes, it would be advantageous to simultaneously access mass spectrometric information for eluting analytes. Separations of SpCas9 protein were accordingly studied not only with the above-described phosphate buffered saline mobile phase, but also with ammonium acetate mobile phases. Such ammonium acetate mobile phases are advantageous in that they may be directly hyphenated with MS detection. UV chromatograms corresponding to the use of 100 mM, 200 mM, 240 mM, 280 mM, 300 mM, and 400 mM ammonium acetate are displayed in FIG. 9. With reference to FIG. 9, a minimum of approximately 300 mM ammonium acetate was required to obtain a symmetrical monomer peak and high recovery.

The optimization of QTof mass spectrometry for the detection of species in the high m/z range was explored. Quadrupole mass filtering was adjusted to destabilize low m/z ions in exchange for more selective detection of ions of 2000 m/z and above. A flow rate of 0.1 mL/min was employed to reduce the desolvation burden of the ESI source. The resulting UV and total ion chromatograms are shown in FIG. 10A, which shows that the 320 mM ammonium acetate mobile phase produced excellent peak shapes for both the monomeric SpCas9 and its HMW species. A zoomed viewed of the chromatogram (FIG. 10B; inset) underscores the quality of this separation. SpCas9 is a large protein that is predicted to have a molecular weight of 158 kDa (UniProt Q99ZW2). It is also predicted to have multiple strong binding pockets for magnesium ions, and it is also plausible for it to be subject to post-translational modifications. Moreover, the SpCas9 construct studied here was recombinantly prepared from the Csn1 gene with a combined C-terminal nuclear localization signal (NLS). This adds a stretch of basic residues with a combined mass of between 1 and 3 kDa. A summed raw mass spectrum was prepared from the monomer peak (FIG. 10B), and this is shown along with a MaxEnt1 deconvoluted spectrum in FIG. 10C. Heterogeneity was observed in the raw spectrum which was appropriately carried through to the determination of the molecular weight information. The two most intense masses deconvoluted from this experiment was 161.5 and 161.9 kDa, both of which are in reasonable agreement to the predicted average mass of the Csn1 gene product and a NLS C-terminal extension (weighing between 1 and 3 kDa). These results demonstrate the utility of the method in providing MS-based interrogation of Cas9 proteins.

The invention claimed is:

1. A method for performing size exclusion chromatography on a sample comprising at least one analyte, the at least one analyte comprising a Clustered Regularly Interspaced Short Palindromic Repeats (CRISPR)-associated (Cas) protein, a CRISPR-related construct, or CRISPR-related complex, the method comprising:
   a. contacting said sample with a column chromatography device comprising a column having an interior for accepting a stationary phase, and an immobilized stationary phase within said interior of the column, wherein the column has an interior wetted surface, wherein at least a portion of its wetted surface comprises a non-ionic, hydrophilic organosilane coating, and wherein the immobilized stationary phase comprises porous particles having a surface, wherein at least some portion of the surface is modified with a hydroxy-terminated polyethylene glycol;
   b. flowing a mobile phase through the immobilized stationary phase for a period of time, the mobile phase comprising water and a buffer; and
   c. eluting the at least one analyte from the immobilized stationary phase in the mobile phase.

2. The method of claim 1, wherein the column chromatography device comprises a system comprising a metallic flow path components having wetted surfaces, wherein at least a portion of the wetted surfaces comprise a non-ionic, hydrophilic organosilane coating.

3. The method of claim 1, wherein the organosilane coating comprises a C2 alkylsilane layer.

4. The method of claim 1, wherein the hydrophilic, non-ionic organosilane coating comprises an organosilane layer comprising a polyethylene glycol (PEG) silane.

5. The method of claim 1, wherein the porous particles comprise silica, an inorganic-organic hybrid material, or a polymer.

6. The method of claim 1, wherein the porous particles comprise inorganic-organic hybrid ethylene bridged particles having an empirical formula of $SiO_2(O_{1.5}SiCH_2CH_2SiO_{1.5})_{0.25}$.

7. The method of claim 1, wherein the hydroxy-terminated polyethylene glycol has the formula:

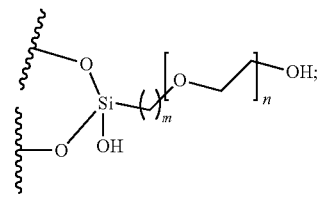

wherein:
   m is an integer from about 1 to about 10;
   n is an integer from about 2 to about 50; and
   wherein the wavy lines indicate points of attachment to the surface of the porous particles.

8. The method of claim 1, wherein the mobile phase buffer comprises phosphate or acetate.

9. The method of claim 8, wherein the mobile phase buffer is selected from the group consisting of ammonium acetate, sodium phosphate monobasic, sodium phosphate dibasic, potassium phosphate monobasic, potassium phosphate dibasic, and combinations thereof.

10. The method of claim 1, wherein the at least one analyte comprises an RNA, a protein, or a ribonucleoprotein complex associated with Clustered Regularly Interspaced Short Palindromic Repeats (CRISPR)-based gene editing.

11. The method of claim 1, wherein the at least one analyte is selected from the group consisting of Cas proteins, single-stranded oligodeoxynucleotide (ssODN) templates, ribonucleoprotein (RNP) complexes, nickases, crRNAs that define complementarity, trans-activating CRISPR RNA (tracrRNA), single-guide RNA (sgRNA), and combinations thereof.

12. The method of claim 1, wherein the at least one analyte comprises a Cas protein.

13. The method of claim 12, wherein the Cas protein is Cas9 or Cas12a.

14. The method of claim 13, wherein the Cas9 protein is expressed by or derived from *Staphylococcus aureus* or *Streptococcus pyogenes*.

15. The method of claim 13, wherein the Cas9 protein does not comprise an affinity handle.

16. The method of claim 13, wherein the Cas9 protein comprises an affinity handle.

17. The method of claim 16, wherein the affinity handle comprises histidine residues.

18. The method of claim 16, wherein the Cas9 protein is monomeric, or wherein a portion of the Cas9 protein is present in the form of one or more aggregates.

19. The method of claim 12, wherein the Cas protein is complexed to an RNA.

20. The method of claim 1, wherein the analyte comprises a protein-free RNA.

21. The method of claim 1, further comprising detecting the presence or absence of the at least one analyte in the sample.

22. The method of claim 1, further comprising differentiating monomeric versus aggregated Cas9 proteins, quantitating monomeric versus aggregated Cas9 proteins, or both.

23. The method of claim 21, further comprising differentiating free and unbound Cas9 proteins, quantitating free and unbound Cas9 proteins, differentiating free and unbound mRNA's quantitating free and unbound mRNA's, or combinations thereof.

24. The method of claim 23, wherein the differentiating and/or quantitating is performed using mass spectrometry.

\* \* \* \* \*